United States Patent
Ogawa et al.

(10) Patent No.: US 11,343,106 B2
(45) Date of Patent: May 24, 2022

(54) SYSTEMS AND METHODS FOR ACCELERATED CERTIFICATE PROVISIONING

(71) Applicant: LG Electronics Inc., Seoul (KR)

(72) Inventors: Henrique S. Ogawa, Sao Paulo (BR); Thomas E. Luther, Sunnyvale, CA (US); Jefferson E. Ricardini, Embu das Artes (BR); Helmiton Cunha, Jr., Olinda (BR); Harsh Kupwade-Patil, Fremont, CA (US)

(73) Assignee: LG ELECTRONICS, INC., Seoul (KR)

( * ) Notice: Subject to any disclaimer, the term of this patent is extended or adjusted under 35 U.S.C. 154(b) by 20 days.

(21) Appl. No.: 15/931,159

(22) Filed: May 13, 2020

(65) Prior Publication Data

US 2021/0111904 A1  Apr. 15, 2021

Related U.S. Application Data

(60) Provisional application No. 62/832,319, filed on Apr. 11, 2019.

(51) Int. Cl.
| | | |
|---|---|---|
| *H04L 9/32* | (2006.01) | |
| *H04W 4/44* | (2018.01) | |
| *H04L 9/06* | (2006.01) | |
| *H04L 67/12* | (2022.01) | |

(52) U.S. Cl.
CPC .......... *H04L 9/3263* (2013.01); *H04L 9/0618* (2013.01); *H04L 67/12* (2013.01); *H04W 4/44* (2018.02); *H04L 2209/84* (2013.01)

(58) Field of Classification Search
CPC ..... H04L 9/3263; H04L 9/0618; H04L 67/12; H04L 2209/84; H04L 9/06; H04W 4/44
USPC .......................................................... 713/190
See application file for complete search history.

(56) References Cited

U.S. PATENT DOCUMENTS

| | | | | |
|---|---|---|---|---|
| 7,813,822 B1* | 10/2010 | Hoffberg | .......... | H04N 21/44222 |
| | | | | 700/94 |
| 9,137,017 B2 | 9/2015 | Fu et al. | | |
| 2002/0038420 A1 | 3/2002 | Collins et al. | | |
| 2002/0184182 A1 | 12/2002 | Kwan | | |
| 2003/0009612 A1 | 1/2003 | Latta | | |

(Continued)

OTHER PUBLICATIONS

Abed, Sa'ed et al., "FPGA Modeling and Optimization of a SIMON LightweightBlock Cipher", MDPI, Sensors (Basel), V.19(4), doi: 10.3390/s19040913, Feb. 21, 2019, pp. 1-3, 5, 7-9, 27.

(Continued)

*Primary Examiner* — Jeffrey C Pwu
*Assistant Examiner* — Nega Woldemariam
(74) *Attorney, Agent, or Firm* — Duane Morris LLP; Philip Woo

(57) ABSTRACT

Embodiments described herein provide systems and methods to prevent, or provide a countermeasure, to a co-existence attack, for example, that may occur in a Security Credential Management System (SCMS) where both regular butterfly key (RBK) protocol and unified butterfly key (UBK) protocol are supported. Embodiments described herein provide, support, employ, or implement hardware acceleration for a Hardware Security Module (HSM), for example, for cryptographic operations (e.g., block ciphers, digital signature schemes, and key exchange protocols).

32 Claims, 18 Drawing Sheets

(56) References Cited

U.S. PATENT DOCUMENTS

| | | | |
|---|---|---|---|
| 2007/0116271 | A1 | 5/2007 | Kurdziel |
| 2010/0317420 | A1* | 12/2010 | Hoffberg ............ G06Q 30/0282 |
| | | | 463/1 |
| 2011/0191581 | A1 | 8/2011 | Shim |
| 2012/0204032 | A1* | 8/2012 | Wilkins .............. H04L 63/0428 |
| | | | 713/170 |
| 2014/0025950 | A1 | 1/2014 | Peeters |
| 2015/0256348 | A1 | 9/2015 | Tschache |
| 2017/0180989 | A1* | 6/2017 | Etzel ....................... H04L 9/088 |
| 2018/0006829 | A1 | 1/2018 | Kravitz et al. |
| 2018/0316511 | A1 | 11/2018 | Meyer et al. |
| 2019/0123915 | A1 | 4/2019 | Simplicio, Jr. et al. |
| 2019/0149342 | A1 | 5/2019 | Fynaardt et al. |
| 2021/0067967 | A1 | 3/2021 | Arzelier et al. |

OTHER PUBLICATIONS

Diehl, William et al., Comparison of Hardware and Software Implementations of Selected Lightweight Block Ciphers, 2017 27th International Conference on Field Programmable Logic and Applications (FPL), Oct. 5, 2017, Sections II-V, 4 pages.

Hutter, Michael et al., 'High-speed Curve25519 on 8-bit, 16-bit, and 32-bit microcontrollers', Designs Codes and Cryptography 77(2), DOI: 10.1007/s10623-015-0087-1; Apr. 17, 2015, 18 pages.

Barreto, Paulo S. L. M., et al., "Schnorr-based implicit certification: improving the security and efficiency of v2x communications," Cryptology ePrint Archive, Report 2019/157, 2019.

Bernstein, Daniel J., "Curve25519: new diffie-hellman speed records," International Workshop on Public Key Cryptography, pp. 207-228. Springer, 2006.

Bernstein, Daniel J., et al., "Twisted Edwards Curves," AFRICACRYPT, vol. 5023 of Lecture Notes in Computer Science, pp. 389-405. Springer, 2008.

Bernstein, Daniel J., et al., "High-speed high-security signatures," J. Cryptographic Engineering, 2(2):77-89, 2012.

Bernstein, Daniel J., et al., "Analysis and optimization of elliptic-curve singlescalar multiplication," Contemporary Mathematics—Finite Fields and Applications, 461, 2008.

Bogdanov, Andrey, et al., "PRESENT: An ultra-lightweight block cipher," International Workshop on Cryptographic Hardware and Embedded Systems—CHES 2007, pp. 450-466. Springer, 2007.

Cadence Design Systems. Tensilica Customizable Processors.

CAMP. Security credential management system proof-of-concept implementation—EE requirements and specifications supporting SCMS software release 1.1. Technical report, Vehicle Safety Communications Consortium, May 2016.

CAR 2 CAR Communication Consortium. Protection Profile V2X Hardware Security Module, 2018.

Cho, Jeonghun, et al., "Fast memory bank assignment for fixed-point digital signal processors," ACM Transactions on Design Automation of Electronic Systems (TODAES), 9(1):52-74, 2004.

Cong, Jason, et al., "Instruction set extension with shadow registers for configurable processors," Proceedings of the 2005 ACM/SIGDA 13th international symposium on Field-programmable gate arrays, pp. 99-106. ACM, 2005.

C-ITS platform, Working Group 5: Security & certification (final report, v1.O). Annex 1: Trust models for cooperative—intelligent transport system (C-ITS). Technical report, European Telecommunications Standards Institute, Aug. 2016.

Fujii, Hayato, et al., "Curve25519 for the cortex-m4 and beyond", Progress in Cryptology—LATINCRYPT 2017, vol. 35, pp. 36-37, 2017.

Grabher, Philipp, et al., "Light-weight instruction set extensions for bit-sliced cryptography," International Workshop on Cryptographic Hardware and Embedded Systems, pp. 331-345. Springer, 2008.

IEEE Standard Specifications for Public-Key Cryptography—Amendment 1: Additional Techniques. IEEE Computer Society, 2004.

Intel Corporation. Nios II Processors, 2019.

ABSTRACT of ISO, International Organization for Standardization. ISO/IEC 29192-2:2012—Information technology—Security techniques—Lightweight cryptography.

Josefsson, S., et al., "Edwards-Curve Digital Signature Algorithm (EdDSA)," Internet Research Task Force (IRTF), Request for Comments: 8032, ISSN: 2070-1721, Jan. 2017.

Khodaei, Mohammad, et al., "The Key to Intelligent Transportation: Identity and Credential Management in Vehicular Communication Systems," IEEE Veh. Technol., Mag., 10(4):63-69, Dec. 2015.

Koscher, Karl, et al. "Experimental security analysis of a modern automobile," 2010 IEEE Symposium on Security and Privacy, pp. 447-462. IEEE, 2010.

Langley, A., et al., "Elliptic curves for security," Technical report, 2016.

Montgomery, Peter L., et al., "Speeding the Pollard and Elliptic Curve Methods of Factorization," Mathematics of Computation, 48(177):243-264, 1987.

Murray, Alastair, et al., "Fast source-level data assignment to dual memory banks," In Proceedings of the 11th international workshop on Software €3 compilers for embedded systems, pp. 43-52. ACM, 2008.

Federal Information Processing Standards (FIPS) Publication 197, "Announcing the Advanced Encryption Standard (AES)," National Institute of Standards and Technology, Nov. 26, 2001.

Federal Information Processing Standards (FIPS) Publication 186-4, "Digital Signature Standard (DSS)," National Institute of Standards and Technology, Jul. 2013.

EVITA Project, "E-safety vehicle intrusion protected applications," Oct. 31, 2008, European Commission research grant FP7-ICT-224275.

Reis, Tiago B. S., et al., "PRESENT runs fast—efficient and secure implementation in software." In Wieland Fischer and Naofumi Homma, editors, Cryptographic Hardware and Embedded Systems—CHES 2017, pp. 644-664, Cham, 2017. Springer International Publishing.

RISC-V Foundation. RISC-V: The Free and Open RISC Instruction Set Architecture, 2019. Available at: https: //riscv.org/.

Saghir, Mazen A.R., et. al., "Exploiting dual data-memory banks in digital signal processors," ACM SIGPLAN Notices, 31(9):234-243, 1996.

Sasdrich, Pascal, et al., "Implementing curve25519 for side-channel-protected elliptic curve cryptography," ACM Transactions on Reconfigurable Technology and Systems (TRETS}, 9(1):3, 2015.

Simplicio, Marcos A., eta al., "The unified butterfly effect: Efficient security credential management system for vehicular communications," 2018 IEEE Vehicular Networking Conference (VNC), pp. 1-8. IEEE, Dec. 2018.

Synopsys, Inc. DesignWare ARC EM APEX Databook—Version 5768-004, 2014.

Synopsys, Inc. DSP Options for ARCvl Cores, 2016.

Synopsys, Inc. DesignWare ARC EM Processor Family, 2019.

Synopsys, Inc. DesignWare ARC MetaWare Development Toolkit, 2019.

Synopsys, Inc. Design Ware ARC xCAM, 2019.

Synopsys, Inc. Performance and Coding Advantages with the ARC XY Memory DSP Option, 2019.

Tay, JJ, et al., "Compact fpga implementation of present with booleans-box." In Quality Electronic Design (ASQED}, 2015 6th Asia Symposium on, pp. 144-148. IEEE, 2015.

Trusted Computing Group (TCG). Tpm specification 1.2 revision 116, 2011.

Tillich, Stefan, et al., "Instruction set extensions for efficient aes implementation on 32-bit processors." International workshop on cryptographic hardware and embedded systems, pp. 270-284. Springer, 2006.

Weimerskirch, Andre, "V2x security & privacy: the current state and its future." ITS World Congress, Orlando, FL, 2011.

Whyte, William, et al., "A security credential management system for V2V communications," IEEE Vehicular Networking Conference (VNC'13), pp. 1-8, 2013.

Xilinx, Inc. UltraScale Architecture Configurable Logic Block, 2017.

Xilinx, Inc. UltraScale Architecture DSP Slice, 2018.

(56) References Cited

OTHER PUBLICATIONS

Xilinx, Inc. Xilinx Zynq UltraScale+ MPSoC ZCU102 Evaluation Kit, 2019.
Yu, Pan, et al., "Disjoint pattern enumeration for custom instructions identification." 2007 International Conference on Field Programmable Logic and Applications, pp. 273-278. IEEE, 2007.
Simplicio, Jr. Marcos A. "The Unified Butterfly Effect: Efficient Security Credential Management System for Vehicular Communications", IEEE Vehicular Networking Conference (VNC), Jan. 31, 2019, 9 pages.

\* cited by examiner

| Proposed instruction | AUX registers | Components | Module | Instances |
|---|---|---|---|---|
| enc64: block encryption | BLK0_AR, BLK1_AR | S-box | sbox | 16 |
| | | Permutation Layer | pLayer | 1 |
| keysch: key schedule | KEY0_AR, KEY1_AR, KEY2_AR, KEY3_AR | S-box | sbox | 2 |
| | | 61-bit left rotation | leftRot_61 | 1 |
| | | 5-bit input XOR | - | 1 |
| dec64: block decryption | BLK0_AR, BLK1_AR | Inverse S-box | isbox | 16 |
| | | Inverse Permutation Layer | ipLayer | 1 |

| Proposed instruction | Description | Auxiliary registers | Datapath modules |
|---|---|---|---|
| mword | Multiply fe element (stored in AUX registers) by word, and accumulate the 288-bit result (mul_word operation, figure 5) | FE0_AR, FE1_AR, FE2_AR, FE3_AR, FE4_AR, FE5_AR, FE6_AR, FE7_AR | mul_word, adder_288, shift_reg |
| shacc | Shift 288-bit accumulator by 32 bits to the right, and return the least significant 32-bit (shift » 32 operation, figure 6) | | |
| rsacc | Reset 288-bit accumulator | | |

FIG. 21

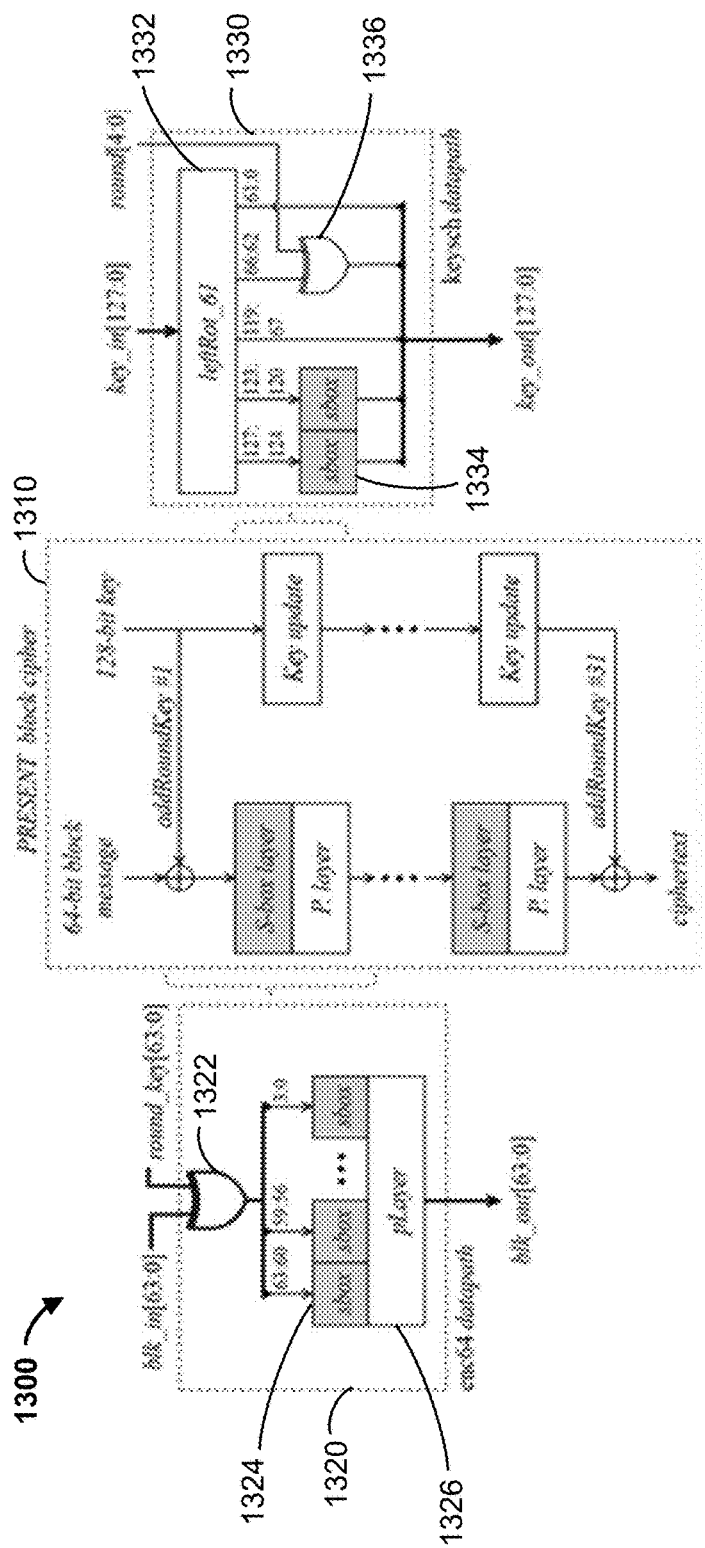
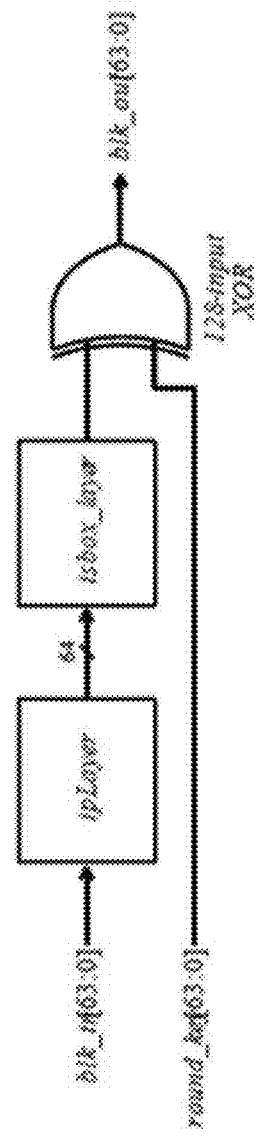
FIG. 13
FIG. 14

| Function | Description |
|---|---|
| fe_mul_word | Multiplication of a fe field element by a word (followed by a weak reduction [13] |
| fe_sqr | Multiplication of a fe field element by itself, followed by a weak reduction [13] |
| fe_power | Multiplication of a fe field element (with weak reduction) by itself N times (fe_sqr in loop) |
| fe_mul | Multiplication of two distinct fe field elements, followed by a weak reduction [13] |

| | X25519 | Ed25519 Key Gen. | Ed25519 Sign | Ed25519 Verify |
|---|---|---|---|---|
| Fujii et al. [13] | 79% | 81% | 81% | 84% |
| ARC SW | 73% | 75% | 75% | 81% |

SYSTEMS AND METHODS FOR ACCELERATED CERTIFICATE PROVISIONING

CROSS REFERENCE TO RELATED APPLICATION

The present application claims priority to U.S. Provisional Patent Application No. 62/832,319, "ACCELERATED V2X PROVISIONING WITH EXTENSIBLE PROCESSOR PLATFORM," filed on 11 Apr. 2019, which is expressly incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention is related to security in communications, in particular for scenarios that use pseudonym certificates to enable secure and privacy-preserving communications between vehicles.

BACKGROUND

In recent times, there has been a surge in digital technologies embedded in physical objects, leading to what is today known as Internet of Things (IoT). This trend has also reached the automotive industry, which has shown a growing interest in exploring interaction models such as Vehicle-to-Vehicle (V2V), Vehicle-to-Infrastructure (V2I) and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones and other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

With the burgeoning of connected vehicles and V2X communication, security and privacy concerns are paramount. Such concerns are usually mitigated by combining cryptographic mechanisms with a suitable key management architecture. However, cryptographic operations may be quite resource-intensive, placing a considerable burden on the vehicle's V2X computing unit. Furthermore, existing protocols are potentially susceptible to security attacks.

BRIEF DESCRIPTION OF THE DRAWINGS

FIG. 6 depicts a table summarizing the co-existence attack, according to some embodiments.

FIG. 10 depicts a table summarizing an extension instructions for PRESENT block cipher, according to some embodiments.

FIG. 13 shows an implementation of the PRESENT cipher box with datapath extension modules for enc64 and keysch instructions, according to some embodiments.

FIG. 14 shows an implementation of an extension module for the decryption instruction in PRESENT cipher box, according to some embodiments.

FIG. 16 depicts a table with a list of multiplicative-based functions in Curve25519 or $F_2 255_{-19}$ implementation, according to some embodiments.

FIG. 17 depicts a table with percentage of the execution time taken by $F_2 255_{-19}$ multiplicative operations, with regards to the specified Curve25519 functions, according to some embodiments.

FIG. 21 depicts a table with a list of custom extension instructions for multiplicative operations on $F_2 255_{-19}$, with correspondent AUX registers and datapath modules, according to some embodiments.

DETAILED DESCRIPTION OF SOME EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
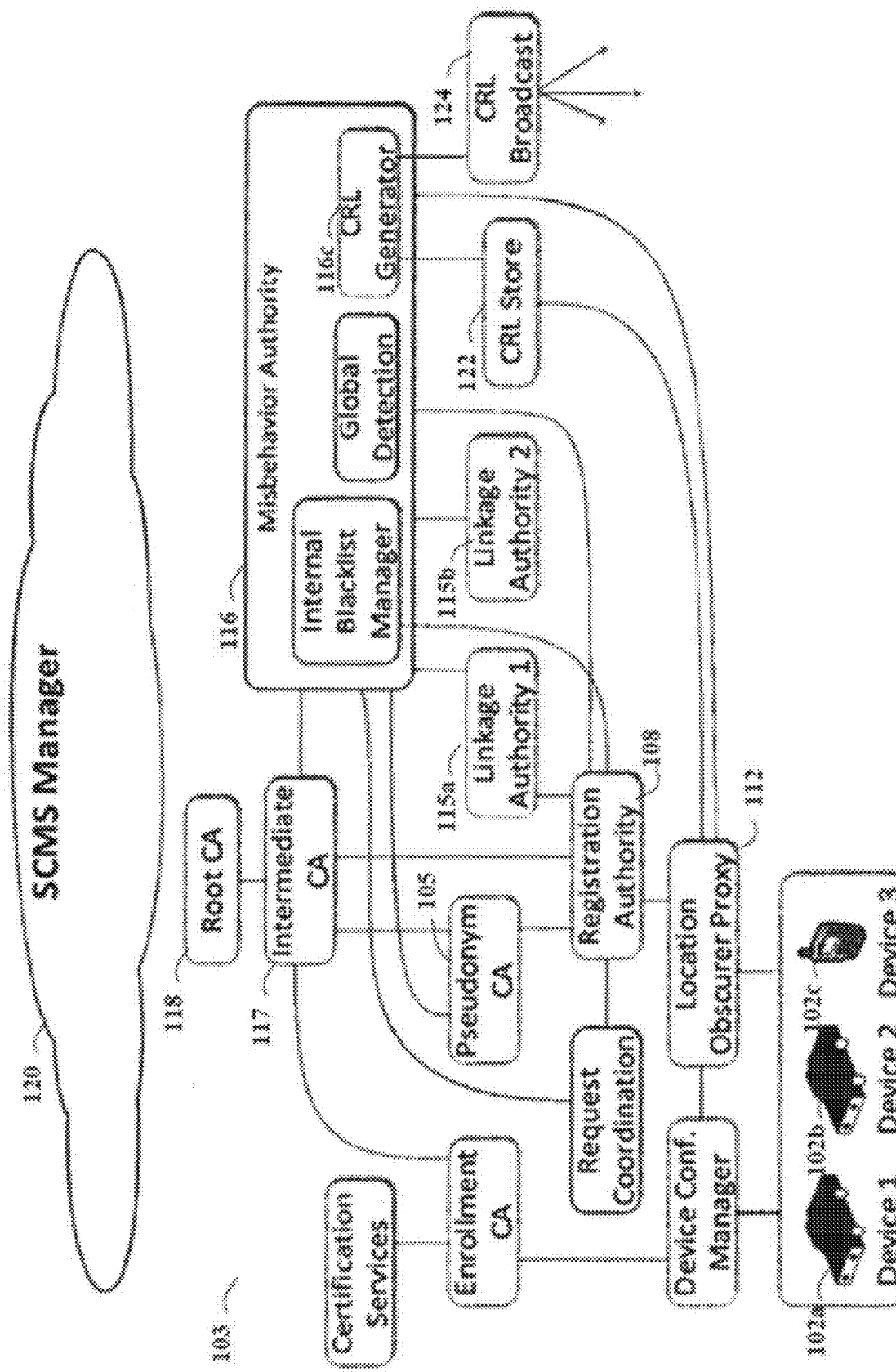
FIG. 1 illustrates an example SCMS infrastructure in which systems and methods of the present disclosure can operate, according to some embodiments.

The following notations are used throughout the description:

G—generator of an elliptic curve group
r, ε—random numbers
sig—a digital signature
cert—a digital certificate
meta—metadata of the digital certificate
U, $\mathcal{U}$—public signature keys (stylized $\mathcal{U}$: reserved for the pseudonym certificate authority)
u, $u$—private signature keys associate with U, $\mathcal{U}$
s—public and private caterpillar keys
Ŝ, ŝ, or S^, s^—public and private cocoon keys
Ê, ê, or E^, e^—public and private caterpillar encryption keys
X, x—public and private unified caterpillar keys
X^, x^ b—public and private unified cocoon keys
β—number of cocoon keys in a batch of certificates
$f$, $f_1$, $f_2$—pseudo-random functions
Enc (K, str)—encryption of bitstring str with key K
Dec (K, str)—decryption of bitstring str with key K
Sign (K, str)—signature of bitstring str, using key K
Ver (K, str)—verification of signature on str, using key K Security Credential Management System FIG. 1 illustrates an example Security Credential Management System (SCMS) infrastructure 103 in which systems and methods of the present disclosure can operate. The SCMS was developed in cooperation with the U.S. Department of Transportation (USDOT) and the automotive industry. SCMS has been used as a leading vehicular public-key infrastructure (VPKI) candidate design for protecting V2X communications. To accomplish this, SCMS's architecture includes a VPKI for issuing multiple short-lived, pseudonym certificates to authorized vehicles. Each vehicle can then use its certificates to digitally sign its messages, so their authenticity can be verified. A vehicle can also avoid tracking attempts by its peers if it periodically changes the pseudonym employed along the way: as a result, it should not be straightforward to link different messages to the same vehicle just by analyzing the corresponding certificates' contents.

Specifically, the SCMS combines an efficient and privacy-preserving method for vehicles to obtain large batches of pseudonym certificates (also known as butterfly key expansion), and an ancillary process for revoking the user's privacy in case of misbehavior, so that multiple certificates belonging to the same user can be linked together. Devices 102a-c, which may be a vehicle, a mobile device, and/or the like, may communicate through the SCMS infrastructure 103.

In SCMS, each device 102a-c receives two types of certificates: an enrollment certificate, which have long expiration times and identify valid devices in the system, and multiple pseudonym certificates, each of which has a short valid period (e.g., a few days). A number C (e.g., ≥1) pseudonym certificates may be valid simultaneously. For protecting the privacy, a particular vehicle (e.g., 102a or 102b) may then frequently change the pseudonym certificate employed in their communications, thus avoiding tracking by nearby vehicles or by roadside units. In some implementations, the number of pseudonym certificates C is usually limited to a small number to avoid "sybil-like" attacks, in which one vehicle poses as a platoon aiming to get some advantage over the system. For example, such a fake platoon could end up receiving preferential treatment from traffic lights programmed to give higher priority to congested roads.

SCMS is configured to allow the distribution of multiple pseudonym certificates to vehicles 102a-c in an efficient manner, while providing mechanisms for easily revoking them in case of misbehavior by their owners. As shown in FIG. 1, the SCMS infrastructure 103 includes a Pseudonym Certificate Authority (PCA) 105 (also referred to as Authorization Certificate Authority (ACA)) that is responsible for issuing pseudonym certificates to devices 102a-c. Registration Authority (RA) 108 receives and validates requests for batches of pseudonym certificates from devices 102a-c via the location obscurer proxy 112, which are identified by their enrollment certificates. Those requests are individually forwarded to the PCA 105, where requests associated with different devices are shuffled together so the PCA 105 cannot link a group of requests to the same device.

In some embodiments, the PCA 105 may include one or more distributed PCA(s), which are connected to a root certificate authority 118 via one or more intermediate certificate authority 117. The root certificate authority 118 may interface with the SCMS manager cloud 120 to receive control commands, configuration data, etc. from the manager could 120.

The SCMS infrastructure 103 further includes Linkage Authority (LA) modules, e.g., 115a-b. The LA modules 115a-b generate random-like bit-strings that are added to certificates so the certificates can be efficiently revoked (namely, multiple certificates belonging to the same device can be linked together by adding a small amount of information to certificate revocation lists (CRLs)). Although two LAs 115a-b are shown in the SCMS infrastructure 103, additional LAs may be supported.

The SCMS infrastructure 103 also includes a Misbehavior Authority (MA) 116 that is configured to identify misbehavior by devices and, if necessary, take appropriate action, for example, by revoking certificates. In some embodiments, the MA 116 revokes the certificates issued to the misbehaved devices by placing their certificates into a CRL. For example, the MA 116 includes a CRL generator 116c that adds the certificates of misbehaved devices to a CRL store 122 and broadcasts the revoked certificate information through a CRL broadcast module 124. If a transgression is confirmed, the MA 116 can collaborate with other system entities to identify the culprit, besides revoking its pseudonym certificates. This prevents malicious users or vehicles equipped with faulty components from disrupting the system for too long. Similarly, an elector-based trust management approach allows system authorities themselves to be revoked in case of misconduct.

Figure 2:
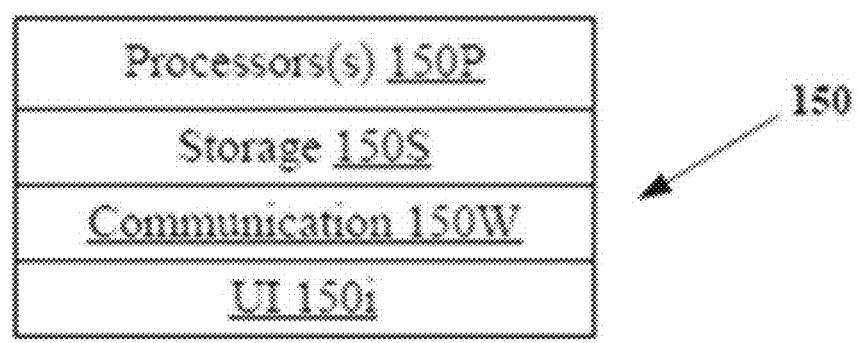
FIG. 2 illustrates an embodiment of a computing device which is used by any of the entities shown in FIG. 1, according to some embodiments.

FIG. 2 illustrates an embodiment of a computing device 150 which is used by any of the entities shown in FIG. 1, according to some embodiments. For example, the computing device 150 may be housed within the vehicle 102a-b, the PCA (or ACA) 105, the RA 108, etc.

As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 150 and/or one or more data structures used during operation of computing device 150. Memory 150S may include one or more types of machine-readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein.

Computing device or equipment 150 may include user interface 150i, e.g., such as present in a smartphone, an automotive information device, or of some other type device, for use by pedestrians, vehicle drivers, passengers, traffic managers, and possibly other people.

Butterfly Key Expansion Process

When compared to other VPKIs, one of the advantages of SCMS is its highly efficient pseudonym certificate provisioning process, called "butterfly key expansion." Two versions of this process exist: (1) an original version, which may be referred to as "regular butterfly key" (RBK), and (2) an optimized version, which may be referred to as "unified butterfly key" (UBK).

Figure 3:
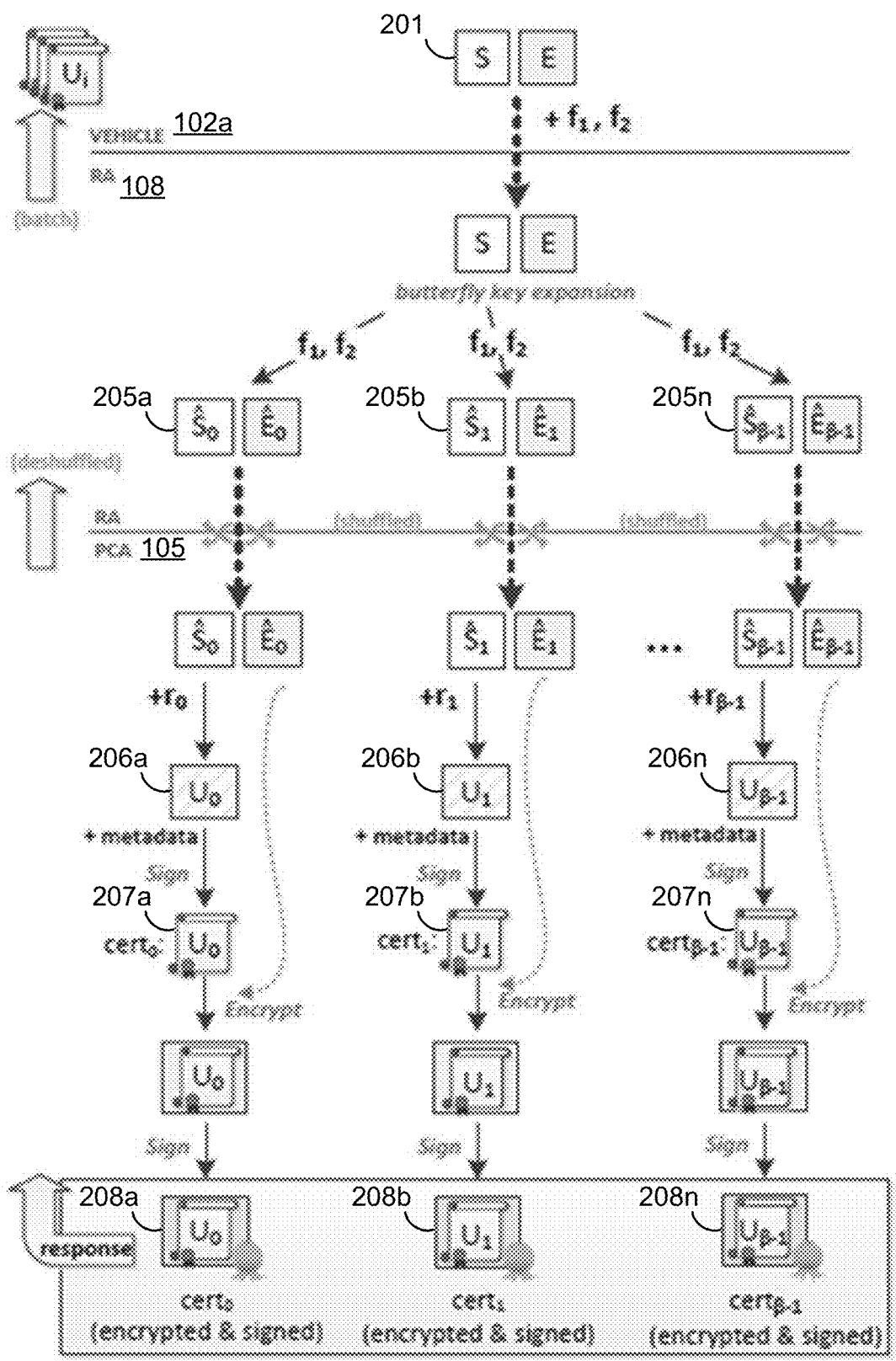
FIG. 3 provides an example diagram illustrating a regular butterfly key expansion in SCMS, according to some embodiments.

FIG. 3 is an example diagram illustrating the regular butterfly key expansion in SCMS. The pseudonym certification provisioning process in SMCS provides an efficient mechanism for devices 102 to obtain arbitrarily large batches of (short-lived) certificates with a small-sized request message. It comprises the following steps, as illustrated in FIG. 3.

First, the device (e.g., vehicle 102a) generates two caterpillar private/public key pairs 201, (s, S=s·G) and (e, E=e·G). The public caterpillar keys 201 S and E are then sent to the Registration Authority (RA 108) together with two suitable pseudorandom functions $f_s$ and $f_e$. The key S is employed by the RA 108 in the generation of β public cocoon signature keys $\hat{S}_i = f_s(i) \cdot G$, where $0 \leq i < \beta$ for an arbitrary value of β; similarly, the RA 108 uses E for generating β public cocoon encryption keys $\hat{E}_i = E + f_e(i) \cdot G$. Pairs of cocoon keys $\hat{S}_i$, $\hat{E}_i$ 205a-n generated through the butterfly key expansion process 203, from different devices are then shuffled together by the RA 108 and sent in batch to the PCA (or ACA) 105 for the generation of the corresponding pseudonym certificates.

After receiving the cocoon keys, the PCA 105 computes the device's public signature key 206a-n as $U_i = \hat{S}_i + r_i \cdot G$, for a random value $r_i$, inserts $U_i$ into a certificate $cert_i$ containing any necessary metadata, and digitally signs this certificate. The signed certificate 207a-n, together with the value of $r_i$ is then encrypted using $\hat{E}_i$, so only the original device can decrypt the result to learn $U_i$ and compute the corresponding private signature key $u_i = s + r_i + f_s(i)$.

The encrypted data is also signed by the PCA 105 using its own private signature key, aiming to prevent an "honest-but-curious" RA 108 from engaging in a Man-in-the-Middle (MitM) attack. Namely, without this signature, a MitM attack by the RA 108 could be performed as follows: (1) instead of $\hat{E}_i$, the RA 108 sends to the PCA 105 a fake cocoon encryption key $\hat{E}^*_i = z \cdot G$, for an arbitrary value of z; (2) the RA 108 decrypts the PCA's response using z, learning the value of $U_i$; and (3) the RA 108 re-encrypts the certificate with the correct $\hat{E}_i$, sending the result to the device, which proceeds with the protocol as usual. As long as the device verifies the PCA's signature on the RA's response, however, the attack would fail because RA 108 would not be able to provide a valid signature for the re-encrypted certificate 208a-n using the private signature key by PCA 105.

The user's privacy is protected in this process as long as the RA 108 and PCA 105 do not collude. After all, the shuffling of public cocoon keys 205a-n performed by the RA 108 prevents the PCA 105 from learning whether or not a group of keys in the batch belong to a same device. Unlinkability of public keys towards the RA 108, in turn, is also obtained because the latter does not learn the value of $U_i$, randomized by the PCA 105 using $r_i$.

In essence, RBK requires vehicles to compute two sets of "caterpillar keys," both created using, in some embodiments, Elliptic Curve Cryptography (ECC): the signature key pair (s,S←s·G) and the encryption signature key pair (e,E←e·G). The vehicle 102 then establishes a secure communication channel with a RA 108 and sends to it: (1) the public keys S and E; (2) two pseudorandom functions, $f_1$ and $f_2$; and (3) long-term credentials (proving that it is authorized to request pseudonym certificates). The butterfly key expansion is then executed twice by the RA 108 during the pseudonym certification provisioning process: once for the signature keys S, and once for the encryption keys E. That is, the RA 108 expands each caterpillar public key into several "cocoon public keys" by applying the vehicle-provided $f_1$ and $f_2$. This leads to as many public key ($\hat{S}_i$←S+$f_1$(i)·G,$\hat{E}_i$←E+$f_2$(i)·G) tuples as the number of pseudonym certificates the vehicle 102 should receive. Subsequently, the RA 108 sends the individual tuples to the PCA 105, which is responsible for issuing pseudonym certificates. To preserve the vehicles' privacy, the RA-to-PCA requests are such that tuples corresponding to different vehicles 102 are shuffled together, and no information about the vehicles' identities is provided to the PCA 105.

The PCA 105, in turn, randomizes the received signature cocoon keys $\hat{S}_i$, obtaining the butterfly keys $U_i$←$\hat{S}_i$+$r_i$·G. Those keys are signed by the PCA 105 together with any relevant metadata (e.g., a validity period), thus producing the corresponding pseudonym certificates cert$_i$. Finally, to prevent the RA 108 from learning the certificates' contents (and, thus, from linking cert$_i$ to the requesting vehicle), the PCA 105 uses $\hat{E}_i$ to encrypt its response to the RA 108. As a result, only the vehicle 102 can decrypt the received package using its private key $\hat{e}_i$←e+$f_2$(i), and verify that cert$_i$ was correctly issued. In addition, in RBK this encrypted package is also signed by the PCA 105 to prevent a malicious RA 108 from acting as a Man-in-the-Middle (MitM). Otherwise, the RA 108 might provide the PCA 105 with a bogus encryption key E$_{ei}$, for which the RA 108 knows the private key. Then, it could decrypt the PCA's response, map cert$_i$ to the vehicle's identity, and then re-encrypt everything with the correct to avoid suspicion. This extra signature by the PCA 105 in RBK leads to additional overheads in multiple places: on the PCA 105, for the computation and transmission of the extra signature; on the RA 108, for its reception and re-transmission; and on the end device 102, for the signature reception and verification, besides the verification of the certificate's signature itself.

Figure 4:
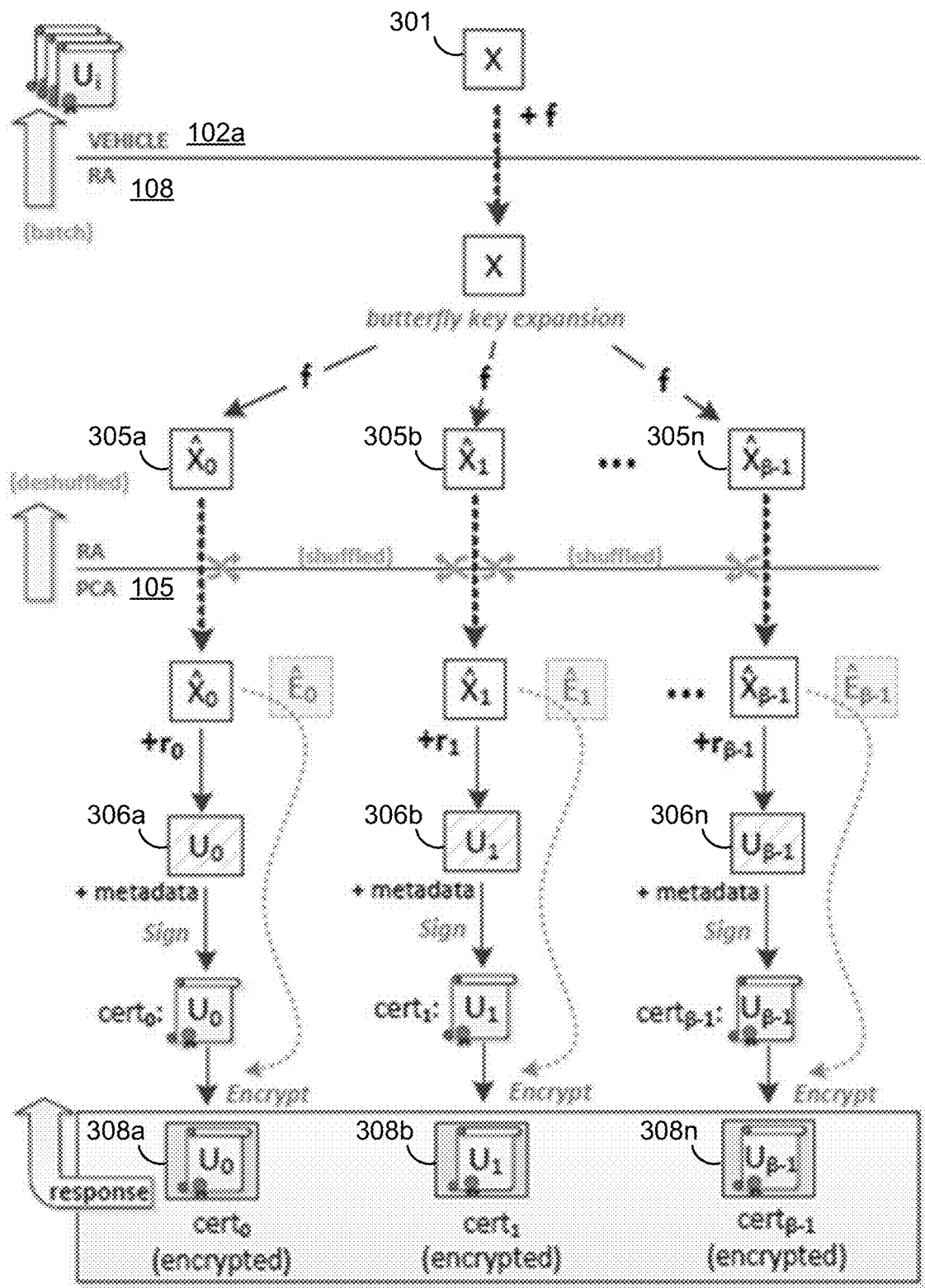
FIG. 4 provides an example diagram illustrating a unified butterfly key expansion in SCMS, according to some embodiments.

FIG. 4 provides an example diagram illustrating the unified butterfly key (UBK) expansion in SCMS. Compared to RBK, the main distinction of the UBK approach is that it involves only one caterpillar public and private key pair 301 (x,X←x·G) instead of two. Accordingly, a single public key X is provided by vehicles 102 to the RA 108, which expands X into several cocoon public keys 305a-n (X$_{bi}$←X+$f$(i)·G) using pseudorandom function $f$. Similarly to RBK, in UBK the RA 108 shuffles X$_{bi}$ from different vehicles 102 before relaying them to the PCA 105. Finally, the PCA 105 creates a randomized butterfly public key 306a-n ($U_i$←X$_{bi}$+$r_i$·G), places it into a certificate, and encrypts the result with X$_{bi}$ before responding to the RA 108. Unlike RBK, however, in UBK there is no need to sign the encrypted package. Since UBK ties the encryption key X$_{bi}$ to the certificate's key $U_i$, the RA 108 cannot provide a fake encryption key E$_{ei}$ without tampering with the certificate itself. In other words, vehicles or devices 102 can indirectly assert that the PCA 105 used the correct encryption key X$_{bi}$=(x+$f$(i))·G simply by verifying that the value of $U_i$ enclosed in the certificate satisfies $U_i$($\hat{x}_i$+$r_i$)·G. Therefore, the UBK approach can be seen as an optimization of RBK approach, reducing bandwidth usage and processing costs when provisioning pseudonym certificates.

UBK/RBK Co-Existence Attack and Solution/Countermeasure

The security of the RBK and UBK approaches or protocols are typically analyzed individually. However, if both RBK and UBK approaches are used in the SCMS environment (e.g., FIG. 1) at the same time, there is a possibility for a MitM attack based on protocol misbinding—i.e., a co-existence attack. In particular, this attack may arise if: (1) both RBK and UBK protocols co-exist at a certain point in time; and (2) vehicles or devices 102 are led to believe they are running the UBK protocol when the PCA (or ACA) 105 is actually running the RBK protocol. Even though the co-existence attack does not invalidate either the RBK or UBK protocol's individual security, since it assumes the protocols are not run exactly as specified, this corresponds to a quite practical scenario. Indeed, this would be the case if some PCAs in operation decide to support only one protocol (either RBK or UBK), even when other PCAs are running both protocols.

Figure 5:
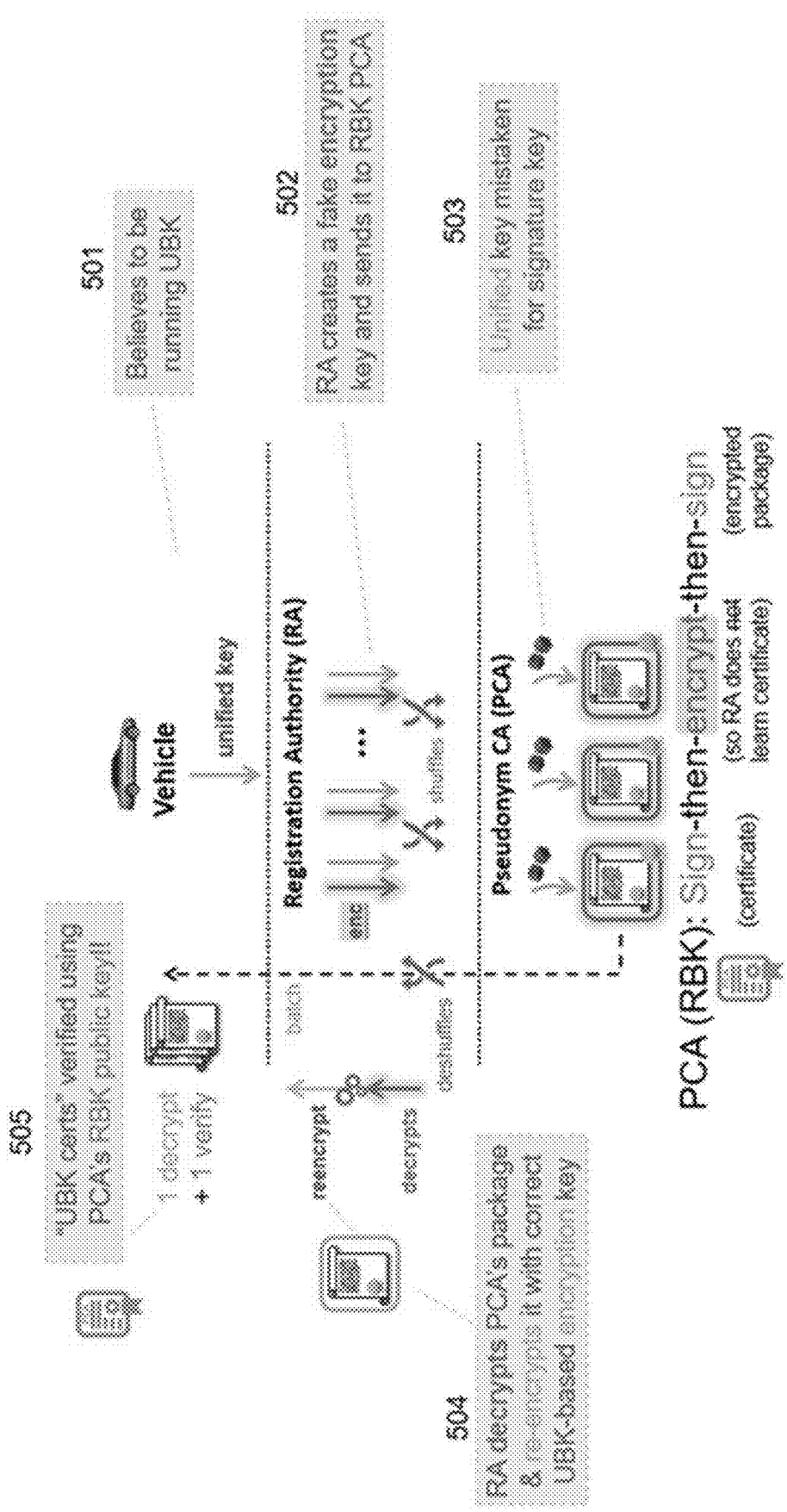
FIG. 5 illustrates a scenario for a co-existence attack, according to some embodiments.

FIG. 5 illustrates a scenario for a co-existence attack. In this co-existence scenario, a malicious RA 108 that wants to be able to track vehicles 102 can perform the following MitM attack (see the bottom part of Table 600 in FIG. 6). First, the rogue RA 108 announces to vehicles 102 that it is able to issue UBK certificates. The victim vehicle 102, attracted by the higher efficiency of UBK procedure, at 501, follows that protocol as usual: it computes the public caterpillar key X and sends it together with the pseudorandom function $f$ to the RA. The RA 108, in turn, computes the correct cocoon keys X$_{bi}$←X+$f$(i)·G, for 0 6 i<β. However, at 502, the RA 108 also creates a fake encryption key—i.e., computes β cocoon encryption keys E$_{ei}$←$z_i$·G for arbitrary values of $z_i$. The RA then sends the pair (X$_{bi}$,E$_{ei}$) to a PCA 105 running RBK, as if such keys were generated according to the RBK protocol. The PCA 105, not knowing of this co-existence attack, at 503, simply runs the RBK protocol for generating pseudonym certificates cert$_i$, encrypts it together with the randomization factor $r_i$, and then signs this encrypted package. The RA 108, instead of acting as a proxy, simply discards this final signature from the PCA's response, and at 504, recovers the corresponding cert$_i$ by means of the decryption key $z_i$.

To complete the MitM attack, the rogue RA 108 also re-encrypts the pair {cert$_i$,$r_i$} with X$_{bi}$, and sends the result to the requesting vehicle 102 as if the encryption was performed by the PCA 105. Since the response received by the vehicle 102 is identical to a genuine UBK package, in principle at 505 that vehicle 102 might believe that the certificates were indeed generated by an UBK-enabled PCA. Meanwhile, the rogue RA 108 learns the contents of all pseudonym certificates issued through it and, thus, can link the real identity of the vehicle 102 to those certificates when they are used in the field. Hence, the described co-existence attack violates one fundamental property of RBK and UBK: the unlinkability of pseudonym certificates by any (non-colluding) system entity. The privacy-by-design of the UBK process is lost.

Figure 6:
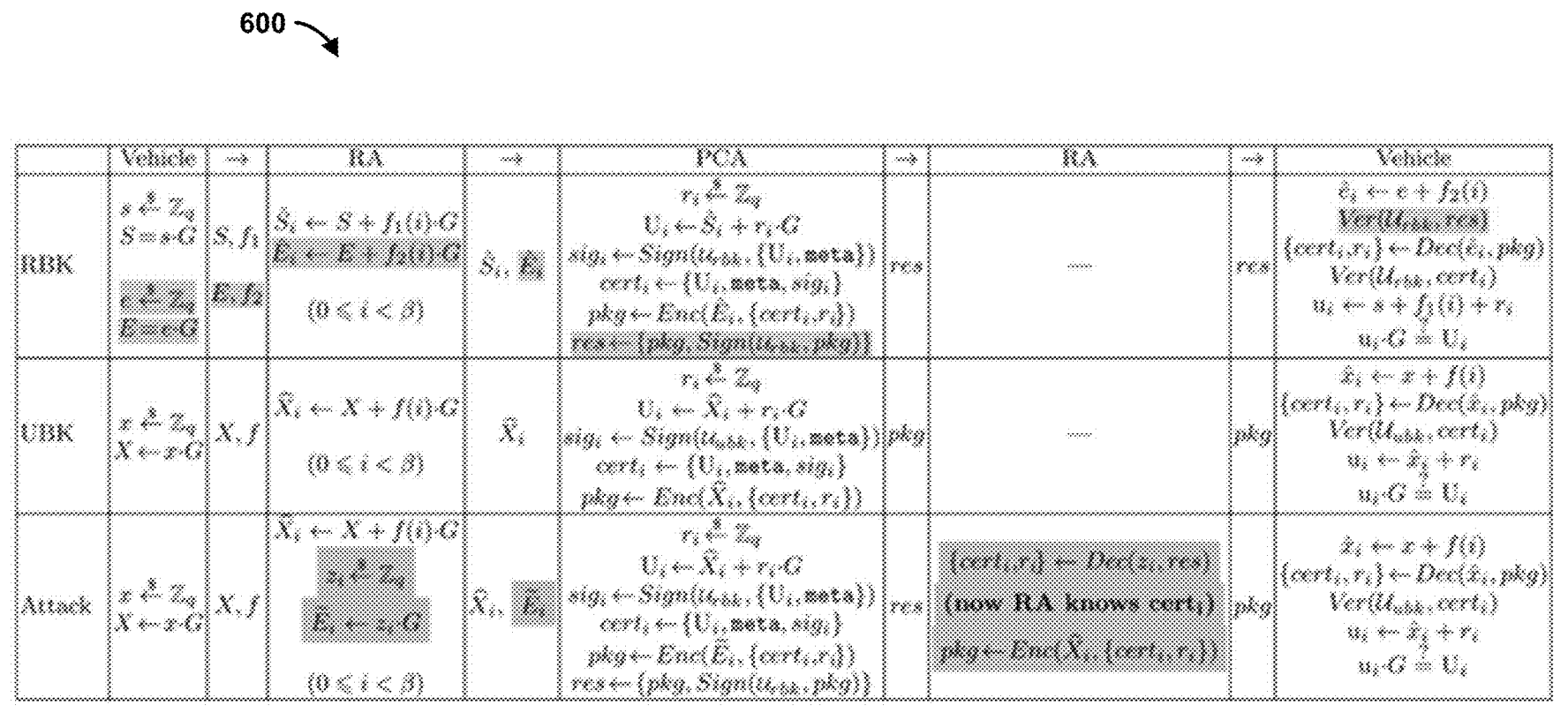

FIG. 6 depicts a table 600 summarizing the co-existence attack, according to some embodiments. Table 600 shows the various assumptions made and processes performed by the various entities (e.g., vehicle 102, RA 108, PCA 105) in a co-existence environment, and the attack that is possible by a rogue RA 108. The root of the problem for the co-existence attack is that vehicle 102 and PCA 105 are unaware that they are running different protocols—i.e., protocol misbinding. That is, the vehicle 102 mistakenly believes that the PCA 105 is running the UBK protocol, but in actuality the protocol being run by the PCA 105 is RBK. In such situation, the vehicle 102 does not require a signature on the encrypted package, which is required in RBK to prevent MitM attempts by the RA 108.

According to some embodiments, systems and methods of the present disclosure can prevent or provide a countermeasure to the co-existence attack, for example, by ensuring or providing that vehicles 102 can verify which protocol (RBK or UBK) has actually been used by the PCA 105.

One approach for the countermeasure to prevent a co-existence attack involves using or including a protocol identifier in the PCA's certificate. In some embodiments, for example, the protocol identifier can be "0" to indicate RBK and "1" to indicate UBK, thus adding little overhead to the system. As a result, the vehicle 102 can check whether the PCA 105 runs UBK or RBK, and then verify the received pseudonym certificates' authenticity using the correct procedure. As long as PCA certificates for RBK do not share the same public key with any PCA certificate for UBK, vehicles 102 cannot be tricked into accepting RBK pseudonym certificates as if they were generated using UBK, thus preventing the co-existence attack. The overhead of this approach is negligible, since it can be as small as adding a single bit to the PCAs' long term certificates.

In another approach for the countermeasure to prevent a co-existence attack, the PCA 105 could use the pseudonym certificate's metadata itself to inform the vehicle 102 about which protocol (UBK or RBK) was employed for its generation. The overhead in this case can once again be as small as a single bit to differentiate between UBK and RBK. Nevertheless, this approach may be less efficient because: (1) there are many more short-term, pseudonym certificates in the system than long-term, PCA certificates; and (2) even though this extra bit is only useful during the issuance process, it must be transmitted afterwards when vehicles sign their own messages.

Figure 7:
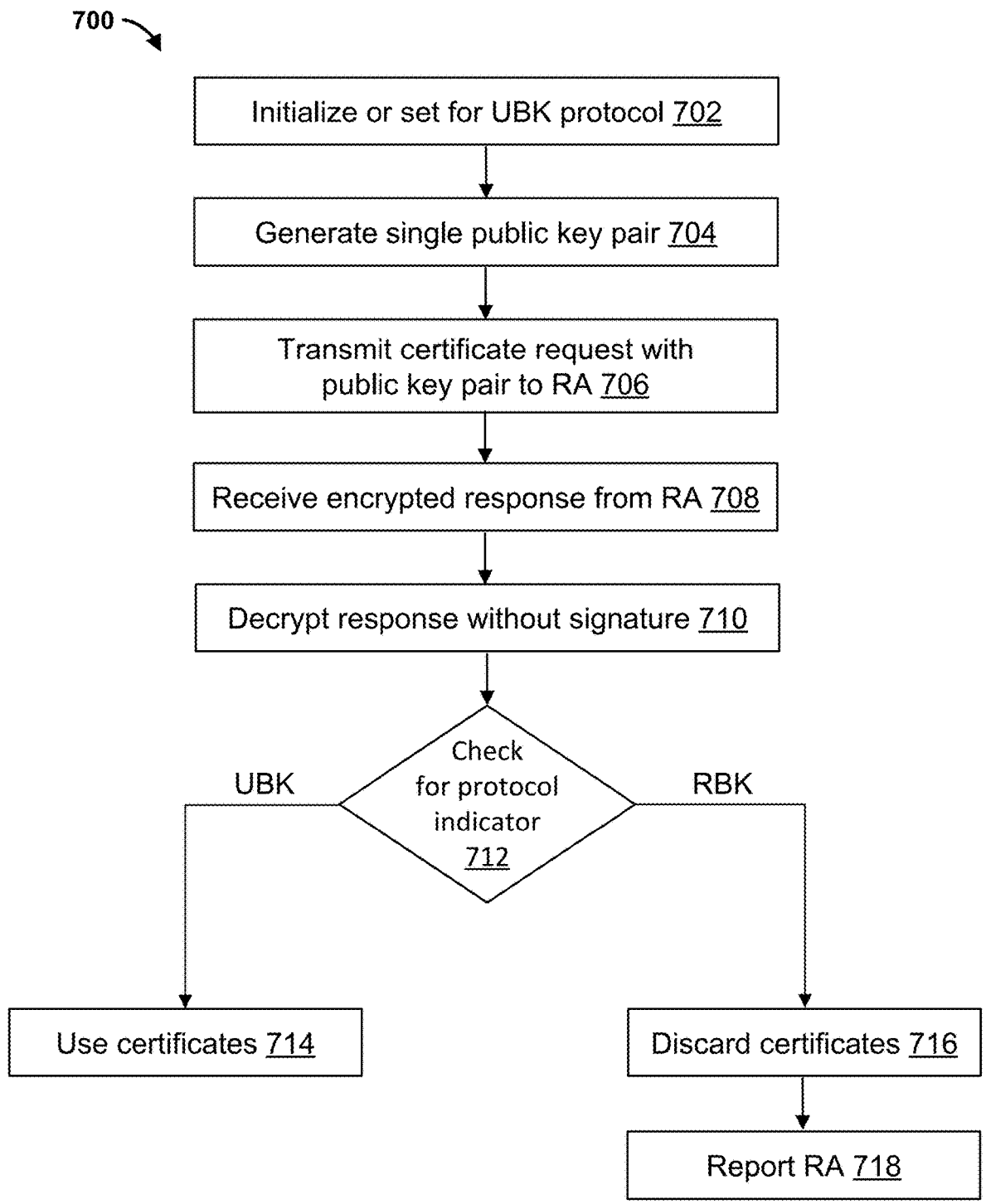
FIG. 7 is a logic flow diagram of a method for a countermeasure for co-existence attack, according to some embodiments.

FIG. 7 is a logic flow diagram of a method 700 for a countermeasure for co-existence attack, according to some embodiments. In some embodiments, method 700 can be performed by vehicle or device 102 in an SCMS environment where both RBK and UBK protocols are being utilized or employed (co-existence).

At 702, vehicle 102 initializes or sets its operation for the UBK protocol. In some embodiment, this initialization is based on an announcement from an RA 108 that it supports or can issue UBK certificates. At this point, it is not clear whether the RA 108 may be acting as a rogue, possibly attempting to breach or compromise security through a MitM attack.

At 704, based on the initialization for UBK protocol, vehicle 102 generates a single caterpillar private/public key for certificate request, according to normal UBK operation.

At 706, vehicle 102 transmits the certificate request with the single public key pair to the RA 108 that announced UBK support.

The RA 108 computes the correct cocoon keys. If the RA 108 is a legitimate actor, it then forwards to the PCA 105 to obtain the certificates under the normal UBK protocol. On the other hand, if the RA 108 is a rogue actor, it creates a fake encryption key and presents this to the PCA (or ACA) 105 as a request under the RBK protocol.

The PCA 105 processes the request from the RA 108 in accordance with the protocol as presented by the RA 108. That is, if the RA 108 is a legitimate actor and presented the request under RBK protocol, the PCA 105 runs the RBK protocol for generating pseudonym certificates, encrypts it together with the randomization factor, and then signs this encrypted package. Alternatively, if the RA 108 is a rogue actor and presented the request under UBK protocol, the PCA 105 runs the UBK protocol for generating pseudonym certificates, but not signing the encrypted package. In either case, in accordance with some embodiments, the PCA 105 includes an indicator of which protocol (RBK or UBK) it employed or utilized. In some embodiments, the indicator can be a protocol identifier—e.g., "0" to indicate RBK and "1" to indicate UBK. In some embodiments, the PCA 105 use the pseudonym certificate's metadata itself to indicate which protocol (UBK or RBK) was employed. The PCA 105 then transmits the encrypted package (with protocol indicator) to the RA 108.

If the RA 108 is a legitimate actor, it processes the encrypted package according to the UBK protocol, and then transmits to the device or vehicle 102 (without compromising security). On the other hand, if the RA 108 is a rogue actor, it discards the final signature from the PCA's RBK response and recovers the corresponding certification, thereby compromising security. The rogue RA 108 transmits the package to the requesting vehicle 102 as if it had been processed or generated under the UBK protocol, even though the PCA 105 had actually processed under the RBK protocol; in particular, the package transmitted to the vehicle 102 does not include a signature.

At 708, the vehicle 102 receives the encrypted response from the RA 108, under the assumption that it has been handled or processed according to the UBK protocol, and thus no signature is present or required. At 710, the vehicle 102 decrypts the package without using a signature, as none would be required under UBK.

At 712, however, the device or vehicle 102 checks for the indicator (e.g., protocol identifier or certificate metadata) as to whether the PCA 105 processed the certificate request under the RBK or UBK protocol. If the indicator indicates that UBK protocol was employed (which would be the case for a legitimate RA 108), then at 714 the vehicle 102 will use the certificates. Alternately, if the indicator indicates that RBK protocol was employed (which would be the case for a rogue RA 108), then at 716 the vehicle 102 will discard the certificates. In some embodiments, the vehicle 102 will record data to note that this particular RA 108 is rogue, and possibly report to authorities in the SCMS environment so that suitable action can be taken (e.g., revocation of authority for the RA 108).

Figure 8A:
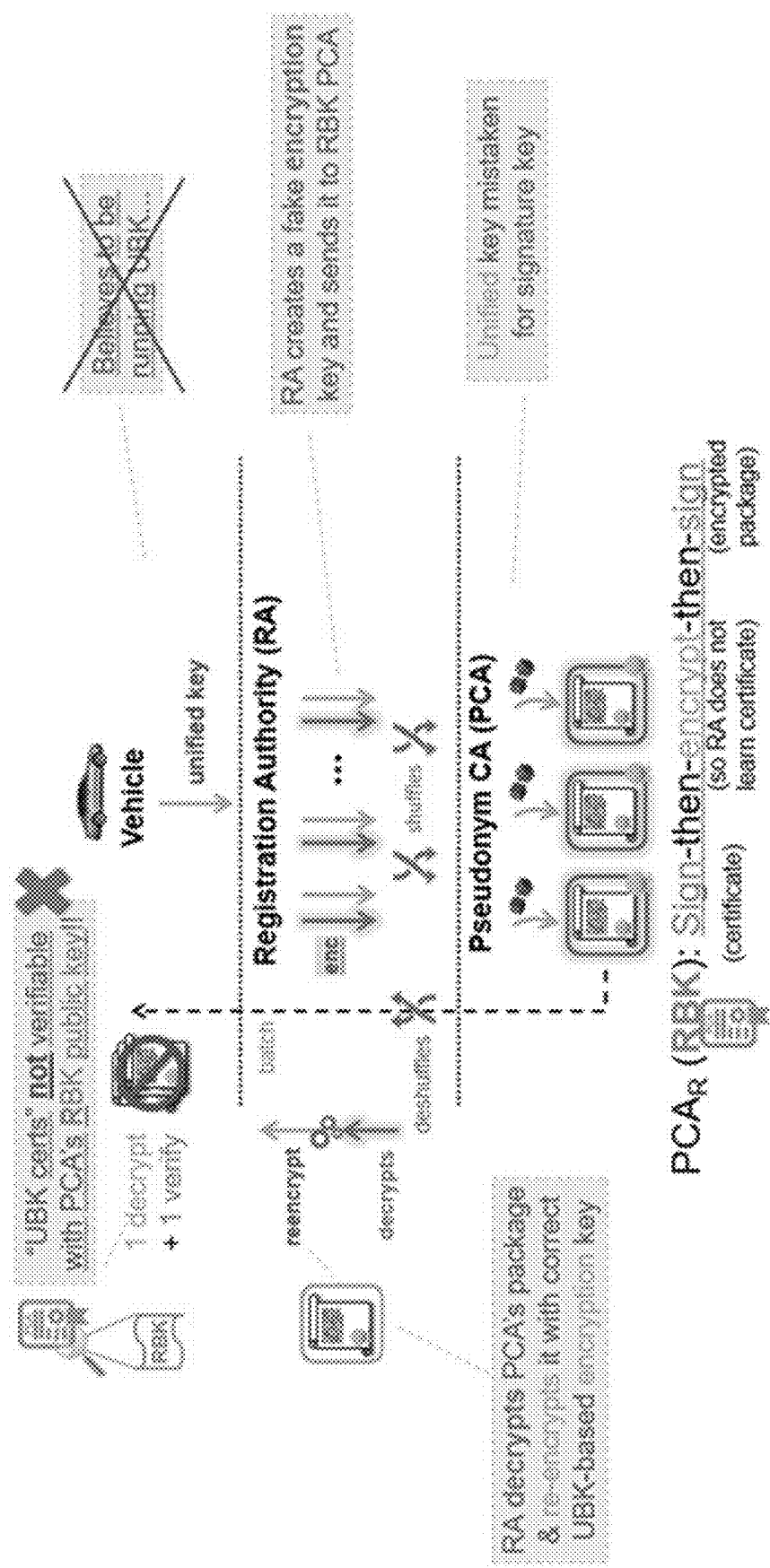
FIGS. 8A and 8B illustrate scenarios for the execution of the countermeasure approaches, according to some embodiments.
Figure 8B:
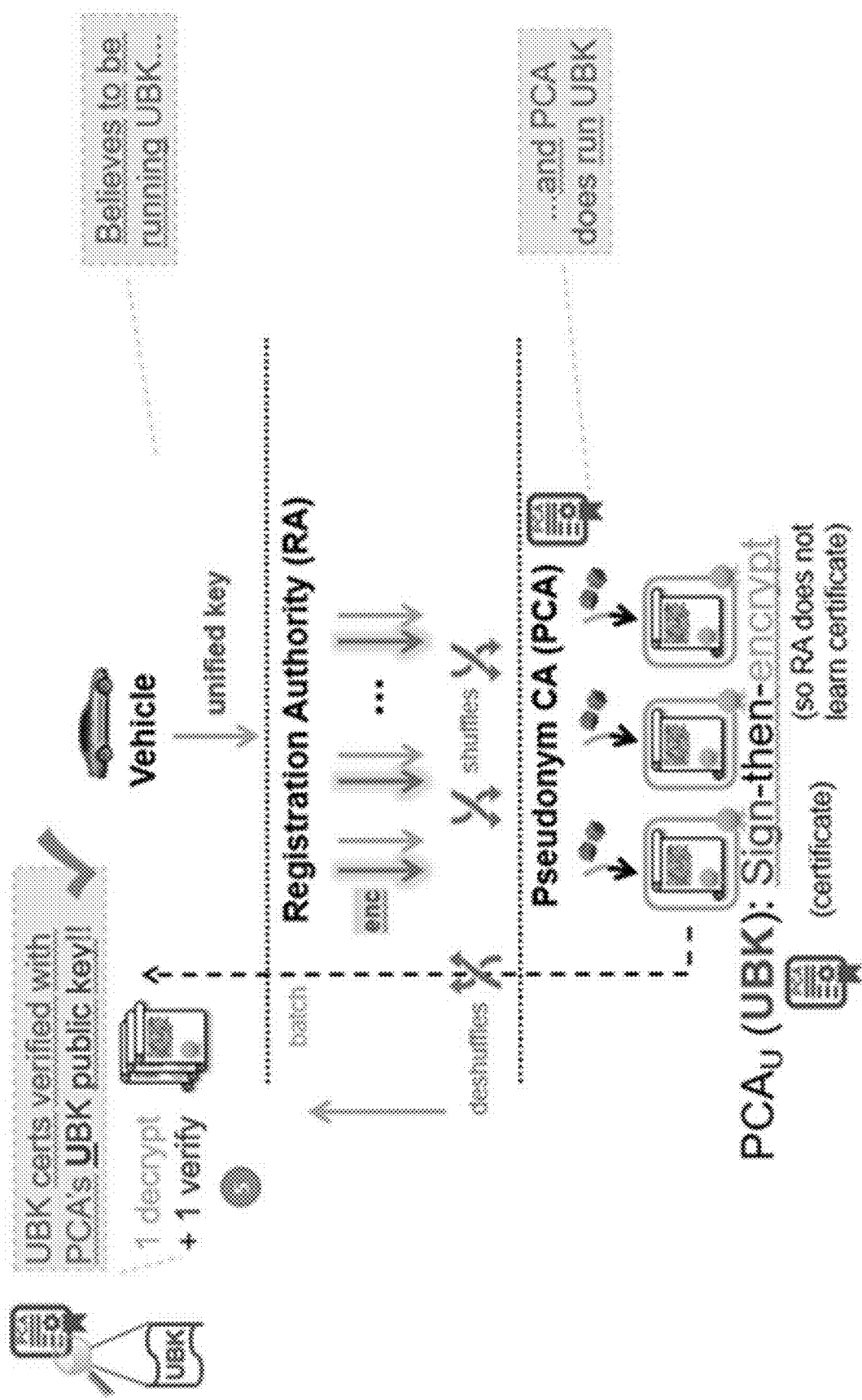

The execution or implementation of the countermeasure approaches is further shown in FIGS. 8A and 8B. FIG. 8A illustrates the case where the vehicle 102 initially believes that the PCA 105 is running UBK, but in actuality the PCA is using RBK. In response to a request from the vehicle 102, the PCA 105 generates certificates using RBK and either includes a protocol identifier (e.g., "0") or uses the certificate's metadata to indicate RBK. Thus, when the vehicle 102 receives the certificates, it can check or verify that the PCA is running UBK. In this case, because the PCA 105 is actually running RBK, the vehicle will know that its initial belief regarding UBK was wrong, and thus security has been potentially compromised. As such, the vehicle 102 will, for example, discard or not use those certificates. Furthermore, at 718, the vehicle 102 may report the RA 108 as a rogue or bad actor to the proper authorities in SCMS so that appropriate action can be taken, e.g., revocation of authority to the RA.

FIG. 8B illustrates the case where the vehicle 102 initially believes that the PCA 105 is running UBK, and in actuality the PCA is doing so. In response to a request from the vehicle 102, the PCA 105 generates certificates using UBK and either includes a protocol identifier (e.g., "1") or uses the certificate's metadata to indicate UBK. Thus, when vehicle 102 receives the certificates, it is verified that the PCA is running UBK as the vehicle initially believed, and as such, the certificates have not been compromised by a co-existence attack.

Figure 9:
FIG. 9 depicts a table summarizing the countermeasure for co-existence attack, according to some embodiments.

FIG. 9 depicts a table 900 summarizing the countermeasure for co-existence attack, according to some embodiments. Table 900 shows the various assumptions made and processes performed by the various entities (e.g., vehicle 102, RA 108, PCA 105) in a co-existence environment, and the countermeasure to the attack that is possible by a rogue RA 108.

Hardware Security Module and Hardware Acceleration

As described herein, the systems and methods of the present disclosure—including aspects and operations of, for example, the vehicles or device 102 of SCMS—can be implemented in some combination of hardware and software. For example, as V2X technologies become pervasive, there is a need for a V2X gateway in the vehicle 102. Furthermore, to support the gateway with key management and cryptographic operations, an embedded Hardware Security Module (HSM) may be used.

Among the many security requirements for the V2X HSM, cryptographic operations (e.g., digital signatures and encryption) and key management are prominent features. The current requirement for processing V2X certificates (e.g., verification of cryptographic signatures and messages) is under 10 milliseconds, thus demanding faster cryptographic operations. And one proposal calls for digital signatures using ECDSA (Elliptic Curve Digital Signature Algorithm), as well as ECIES (Elliptic Curve Integrated Encryption Scheme) for the encryption of one-time session keys. Both ECDSA and ECIES are built upon elliptic curve arithmetic and a hash function, and ECIES additionally makes use of a symmetric cipher and a MAC. Supporting elliptic curves requires finite field arithmetic for operands much larger than the typical processor word size. Implementing symmetric algorithms efficiently in embedded system software can be a challenge when side-channel protection is required. In short, cryptographic operations may be quite resource-intensive, placing a considerable burden on the vehicle's V2X computing unit To address this, in some embodiments, systems and methods of the present disclosure provide, support, employ, or implement hardware acceleration for HSMs, for example, for their cryptographic operations (e.g., common cryptographic primitives, such as block ciphers, digital signature schemes, and key exchange protocols). Hardware acceleration can be achieved in various ways, including either by connecting independent memory-mapped co-processor modules to the main central process unit (CPU), or by extending the CPU with custom instructions. In some embodiments, throughput and latency requirements can be used to determine or select which option for hardware acceleration is more suitable. In some examples, custom extension instructions are developed and employed since they achieve fine-tuned hardware acceleration with a low to moderate logic overhead, while also reducing code size.

Extensible Processor Platform

As an example, some implementations of SCMS use or employ the PRESENT cipher block (as described below in more detail). The PRESENT cipher's round substitution and permutation operations can be implemented with a combinatorial logic datapath. Connecting such a datapath via a memory-mapped bus interface introduces significant processing latency, which is inherent to the process of moving data through the bus infrastructure. In comparison, an extensible processor platform allows for the same datapath to become an extension of the base Arithmetic Logic Unit (ALU), which can be accessed in software just like any other instruction. Thus, in a bit-sliced implementation of PRESENT cipher's substitution and permutation operations, dozens of regular CPU instructions can be replaced with a single custom extension instruction.

Replacing software operations by specialized instructions reduces code size, memory accesses and register usage. In addition to the reduced processing latency, the energy consumption decreases. Therefore, an extensible processor platform can provide or support hardware acceleration where fine-tuned improvements can be achieved with low logic overhead and reduced energy consumption.

One example of an extensible processor platform is based on the ARC EM Processor Family. The DesignWare® ARC® Processor IP portfolio from Synopsys includes a wide range of processors for embedded applications. The ARC EM Processor Family, based on the 32-bit ARCv2 instruction set, features a Harvard memory-processor architecture for simultaneous instruction and memory access. A broad set of digital signal processing (DSP), security and interconnection processor components allows these processors to be configured for highly specialized embedded applications. The ARC Processor EXtension (APEX) technology enables the integration of user-defined custom instructions, while the ARC XY Memory DSP Option brings a DSP engine for IILP in ARC EM processors.

Figure 11:
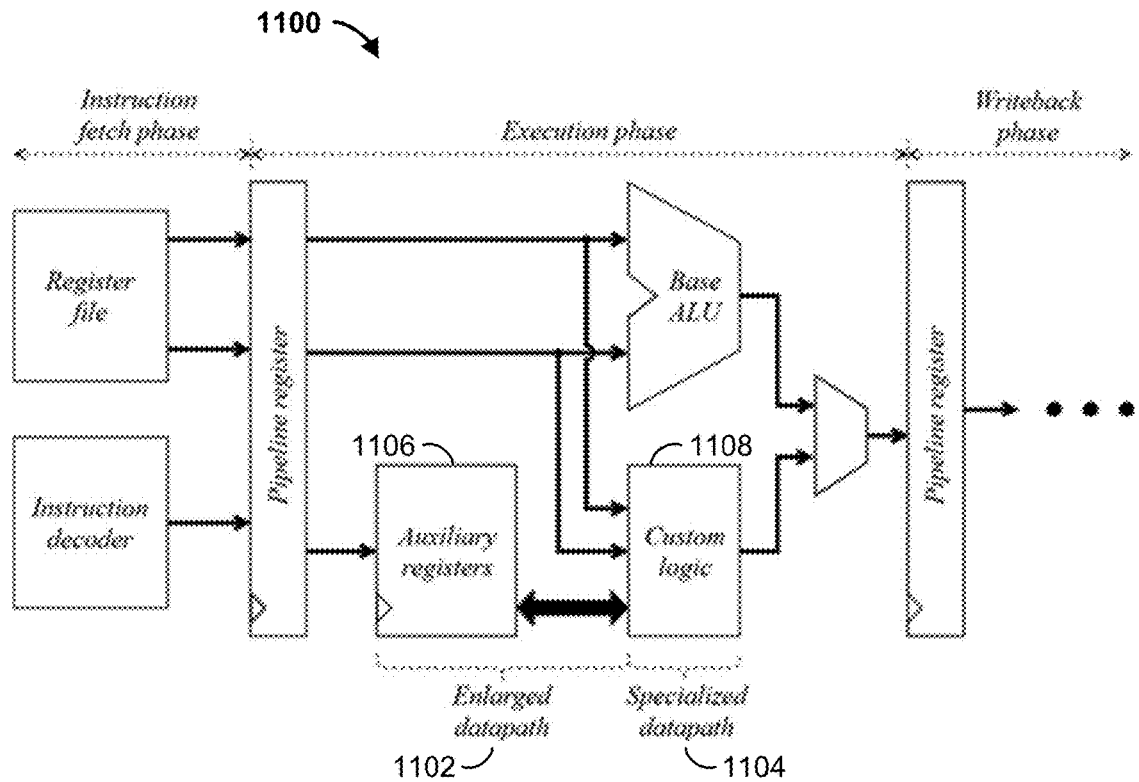
FIG. 11 shows the anatomy of an instruction extension on an extensible processor platform, according to some embodiments.

APEX Technology. APEX technology allows for customization of the ARC processor implementation through user-defined instructions and auxiliary (AUX) registers. The provided pipeline interfaces allow for the implementation of specialized and enlarged-width datapaths. This enables smooth software integration, reduced interfacing complexity, lower gate count and processing output latency when compared to a bus-based co-processor. FIG. 11 shows the anatomy of an instruction extension on an extensible processor platform 1100—in particular, a custom instruction in APEX technology, with respect to an overview of ARC processor's pipeline. The instruction extension may comprise an enlarged datapath 1102 and/or specialized datapath 1104 implemented with auxiliary registers 1106 and custom logic 1108.

Figure 12:
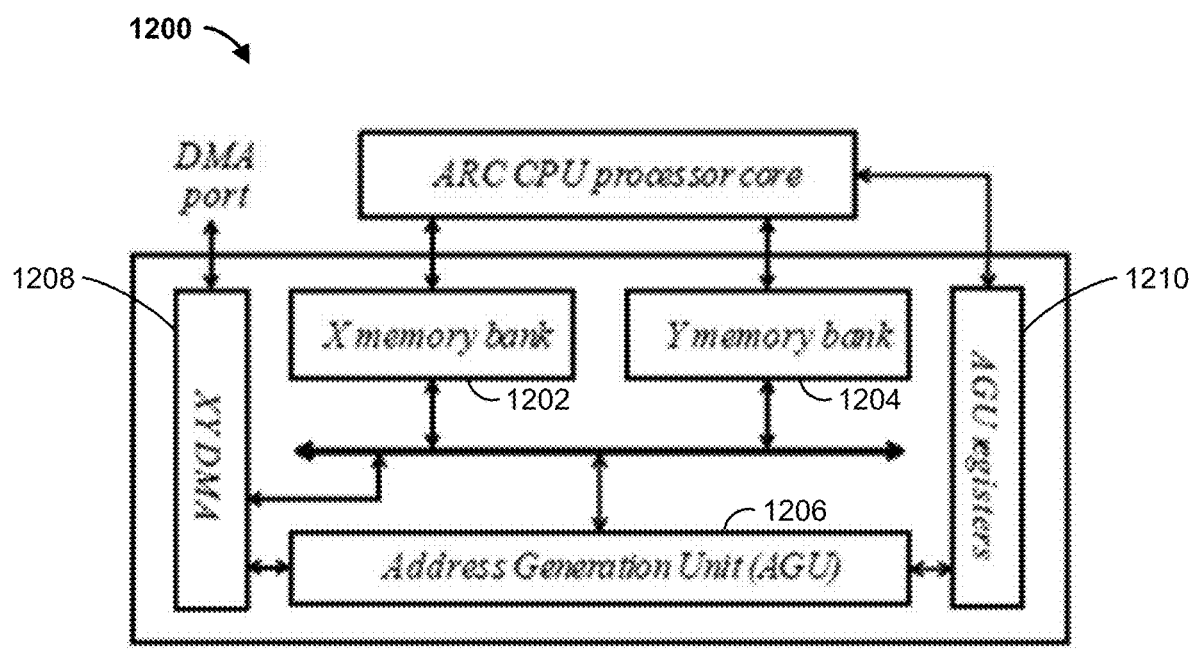
FIG. 12 shows an overview of an implementation of a processor core with dual memory banks, according to some embodiments.

ARC XY Memory DSP Option. Alongside the extension instructions, IILP can be achieved through the ARC XY Memory DSP Option, an Instruction-Level Parallelism (IILP) engine for fast and closely coupled memory access. FIG. 12 shows an overview of the ARC XY Memory DSP Core 1200. As depicted in FIG. 12, the ARC XY Memory system 1200 comprises dual-data memory banks (i.e., X memory bank 1202 and Y memory bank 1204) operated by an Address Generation Unit (AGU) 1206 and an internal dedicated direct memory access (DMA) engine 1208, which allows the CPU to read two source operands and store the result in the same cycle. This also provides increased code density since explicit array index updates can be directly leveraged with the AGU's address update mechanism.

Custom Extension Instructions

Some extensible processor platforms support the inclusion of custom logic via extension instructions. In these platforms, closely-coupled hardware interfaces are exposed for the connection of specialized logic modules into the main processor's pipeline. Such connections, however, can impose more restrictive critical path constraints: complex custom instructions with longer datapaths can decrease the processor's maximum clock frequency. One solution is introducing pipeline registers to split the instruction datapath into multiple stages, increasing the maximum clock frequency. This approach, however, increases the number of required registers, meaning larger chip area, as well as additional latency. Optionally, an instruction datapath with several pipeline stages can be divided into multiple instructions with shorter datapaths. In some embodiments, the throughput of these smaller collective instructions can be improved using Implicit Instruction-Level Parallelism (IILP) techniques.

PRESENT Block Cipher and Extension

Various encryption and security schemes and models are employed in SCMS. The original RBK expansion process proposed in SCMS uses or assumes use of Elliptic Curve Cryptography (ECC), which in some embodiments is implemented with or employs the Elliptic Curve Digital Signature Algorithm (ECDSA), the asymmetric Elliptic Curve Integrated Encryption Scheme (ECIES), and Advanced Encryption Standard (AES) block cipher. A UBK implementation for SCMS, in some embodiments, focuses on curves defined over prime fields which can be represented in the Montgomery (or Twisted Edwards) model, allowing faster formulas. In one version, the twisted Edwards representation of Curve25519 is known as "edwards25519."

The edwards25519 curve enables the use of Edwards-curve Digital Signature Algorithm (EdDSA), which is a signature scheme variant of Schnorr signatures based on elliptic curves represented in the Edwards model. Like other discrete-log based signature schemes, EdDSA requires a secret value, or nonce, unique to each signature. In order to reduce the risk of random number generator failures, EdDSA calculates this nonce deterministically, as the hash of the message and the private key. Thus, the nonce is very unlikely to be repeated for different signed messages. This reduces the attack surface in terms of random number generation and improves nonce misuse resistance during the signing process. However, high quality random numbers are still needed for key generation. Given the aforementioned advantages of EdDSA over ECDSA, in some embodiments, EdDSA may be selected or used as the underlying signature algorithm for the UBK provisioning process.

For the encryption algorithm, in some embodiments, the symmetric PRESENT block cipher may be used or employed. The PRESENT block cipher is a lightweight block cipher algorithm, which is notable for its compact size (about 2.5 times smaller than AES), and as such, can be a desirable hardware implementation in the SCMS environment. A block cipher may employ or be implemented with one or more substitution boxes (S-boxes) and one or more permutation layers or boxes (pLayers or P-boxes). An S-box is a basic component of symmetric key algorithms which performs substitution; in block ciphers, S-boxes are typically used to obscure the relationship between the key and the ciphertext. A P-box or pLayer is used to permute or transpose bits across S-boxes inputs, retaining diffusion while transposing. In block ciphers, the S-boxes and P-boxes are used to make the relationship between the plaintext and the ciphertext difficult to understand.

In some embodiments, PRESENT block cipher's 4-bit substitution box (S-box) can be implemented as a lookup table. However, this approach is vulnerable to cache memory timing attacks. A constant-time and bit-sliced software implementation targeting ARM processors has also been presented. In this example, the 64-bit S-box layer is implemented as 14 Boolean operations over the four 16-bit word inputs, and 15 boolean operations for the inverse S-box counterpart. The proposed methods of interchanging permutations and S-boxes, and the decomposition of permutations resulted in substantial performance improvements for software implementations.

In some embodiments, systems and methods of the present disclosure apply custom extension instructions along with dual-data memory banks for the hardware acceleration of the PRESENT block cipher, as well as for the $F_2 255_{-19}$ finite field arithmetic employed in cryptographic primitives based on Curve25519 (e.g., EdDSA and X25519). As a result, when compared with previously developed software-optimized implementation, the performance of the PRESENT block cipher is improved by a factor of 17 to 34 and code size is reduced by 70%, with only a 4.37% increase in field programmable gate array (FPGA) logic overhead. In addition, the performance of operations over Curve25519 is improved by a factor of ~2.5 when compared to an Assembly implementation on a comparable processor, with moderate logic overhead (namely, 9.1%). Finally, significant performance gains are achieved in the V2X provisioning process by leveraging our hardware accelerated cryptographic primitives.

Instruction Extensions for PRESENT Block Cipher

The PRESENT block cipher's design can be implemented in a combination of hardware and software. In some embodiments, the systems and methods of the present disclosure employ or implement single-cycle non-blocking extension instructions or custom logic for the computation of PRESENT cipher's encryption, decryption and key update round. Because the PRESENT block cipher's size is 64-bits, two AUX registers can be used to implement a 64-bit datapath for the encryption instruction (enc64), and another two AUX registers for the decryption instruction. Likewise, four AUX registers are used in the implementation of a 128-bit datapath for the key schedule instruction (keysch). The table 1000 in FIG. 10 summarizes the proposed extension instructions for PRESENT block cipher, alongside the logic modules used or employed for the implementation of the respective instruction's datapath, according to some embodiments.

FIG. 13 shows an implementation 1300 of the PRESENT cipher box 1310 with datapath extension modules or custom logic 1320, 1330 for enc64 and keysch instructions, according to some embodiments.

enc64 instruction datapath: In some embodiments, the PRESENT S-box implementation 1300 uses the boolean equations for the S-box output bits that are obtained from the application of Karnaugh mapping, followed by the Quine-McCluskey logic minimization algorithm. A Verilog code snippet for an implementation of the Boolean S-box for enc64 and keysch instructions, according to some embodiments, is provided below:

---
Listing 1
---

```
input in3, in2, in1, in0;    // in3 is the most significant bit output out3, out2, out1, out0; //
out3 is the most significant bit
assign out3 = (~in3 & ~in1 & ~in0) | (~in3 & in1 & in0) |
    (in3 & ~in2 & in0) | (in3 & ~in2 & in1) |
    (~in3 & in2 & in1);
assign out2 = (~in2 & in1 & ~in0) | (in3 & in2 & ~in1) |
    (~in2 & ~in1 & in0) | (~in3 & ~in2 & ~in1) |
    (~in3 & in2 & in1 & in0);
assign out1 = (in3 & in2 & in0) | (in3 & ~in2 & ~in1) |
    (~in3 & in1 & ~in0) | (~in3 & ~in2 & in1) |
    (in3 & ~in2 & ~in0);
assign out0 = (~in3 & in1 & in0) | (in3 & in1 & ~in0) |
    (in3 & ~in2 & ~in0) | (~in3 & ~in2 & in0) |
    (~in3 & in2 & ~in1 & ~in0) | (in3 & in2 & ~in1 & in0);
```

The permutation layer (pLayer or P-boxes), which is used to permute or transpose bits across S-boxes inputs, can be implemented in hardware through simple bit-wiring. A Verilog code snippet for an implementation of the pLayer module, according to some embodiments, is provided below:

---
Listing 2
---

```
input[63:0] in; output[63:0] out;
genvar i; generate for (i=0;i<64;i=i+4) begin
    : g assign out[i/4] = in[i]; assign out[i/4 + 16]
    = in[i+1]; assign out[i/4 + 32] = in[i+2]; assign
    out[i/4 + 48] = in[i+3];
    end endgenerate
```

In some embodiments, the S-box layer is a module composed by sixteen instances of sbox together within a single module. As seen in FIG. 13, in some examples, in custom logic or extension module 1320, the datapath for the enc64 instruction is obtained by wiring the outputs of the 128-input XOR module 1322 (addRoundKey) to the inputs of the S-box layer module 1324, whose outputs are then connected to the pLayer (Listing of Table 12) module 1326's inputs. The blk_out signal is the output of a single PRESENT round.

keysch instruction datapath: The 61-bit left rotation step of the PRESENT key schedule can be achieved similarly to the bit-wiring method used for the pLayer implementation. A Verilog code snippet for an implementation of the leftRot_61 module, according to some embodiments, is provided below:

---
Listing 3
---

```
input[127:0] in; output[127:0] out;
genvar i; generate for (i=127;i>=0;i=i-
1) begin: g if (i-61>=0) assign out[i] =
in[i-61];
    else assign out[i] = in[i+67];
    end endgenerate
```

In some embodiments, in custom logic or module 1330, the datapath for the proposed keysch instruction is obtained by connecting the leftRot_61 module 1332, sbox modules 1334 and XOR gates 1336, as shown in FIG. 13. The key_out output signal shown in FIG. 13 is the result of a single round of the key schedule, and the key_out [127:64] output signal is the round sub-key key for a given encryption round.

dec64 instruction datapath: For the PRESENT cipher's inverse S-box module (isbox), the procedure used for the S-box module is repeated. FIG. 14 shows an implementation 1400 of an extension module or custom logic for the decryption instruction in PRESENT cipher box. That is, FIG. 14 shows an implementation 1400 for a datapath of proposed dec64 instruction for PRESENT decryption, according to some embodiments. A Verilog snippet code for an implementation of isbox module 1402 for dec64 instruction, according to some embodiments, is provided below.

---
Listing 4
---

```
input in3, in2, in1, in0; // in3 is the most significant bit output out3,
out2, out1, out0; //
out3 is the most significant bit
assign out3 = (~in3 & ~in2 & in0) | (~in3 & ~in2 & in1) |
        (~in3 & in1 & in0) | (in3 & in2 & in1) |
        (~in3 & in2 & ~in1 & ~in0) | (in3 & ~in2 & ~in1 & ~in0);
assign out2 = (~in3 & ~in2 & ~in1) | (~in3 & ~in1 & ~in0) |
        (~in2 & in1 & ~in0) | (in3 & ~in1 & in0) |
        (~in3 & in2 & in1 & ~in0);
assign out1 = (~in3 & in1 & ~in0) | (in3 & ~in2 & ~in0) |
        (in3 & ~in2 & in1) | (in3 & in2 & in0) |
        (~in3 & ~in2 & ~in1 & ~in0);
assign out0 = (~in3 & ~in2 & ~in0) | (~in2 & ~in1 & ~in0) |
        (~in3 & in2 & in0) | (in2 & ~in1 & in0) |
        (in3 & ~in2 & in1 & in0) | (in3 & in2 & in1 & ~in0);
```

The inverse permutation layer (ipLayer) 1404 can also be implemented in hardware through simple bit-wiring. A Verilog snippet for an implementation of the ipLayer module 1404, according to some embodiments, is shown below:

---
Listing 5
---

```
input[127:0] in; output[127:0] out;
genvar i; generate for (i=0;
i<16; i=i+1) begin : g
    assign out[4*i]    = in[i]; assign out[4*i +
1] = in[i + 16]; assign out[4*i + 2] = in[i + 32];
assign out[4*i + 3] = in[i + 48]; end
endgenerate
```

In some embodiments, the inverse S-box layer 1402 is composed of sixteen isbox module instances (Listing 4). The datapath of the proposed dec64 instruction is obtained by connecting the outputs of the ipLayer module 1404 to the inputs of the inverse S-box layer 1402, whose output is then wired to the 128-input XOR gate 1406 (i.e. addRoundKey), as depicted in FIG. 14.

APEX integration: In order to integrate the instructions proposed in the table 1000 of FIG. 10 into the APEX pipeline, in some embodiments, the datapath or custom logic modules of the enc64, keysch and dec64 instructions (FIGS. 13 and 14) should be connected to the designated AUX registers. The AUX registers shown in the table of FIG. 10 are visible to the traditional load/store instructions. The instruction operands and result can be used to transfer data to and from the instruction modules 1320, 1330, 1400, in an implementation 1500 as shown in FIG. 15.

Figure 15:
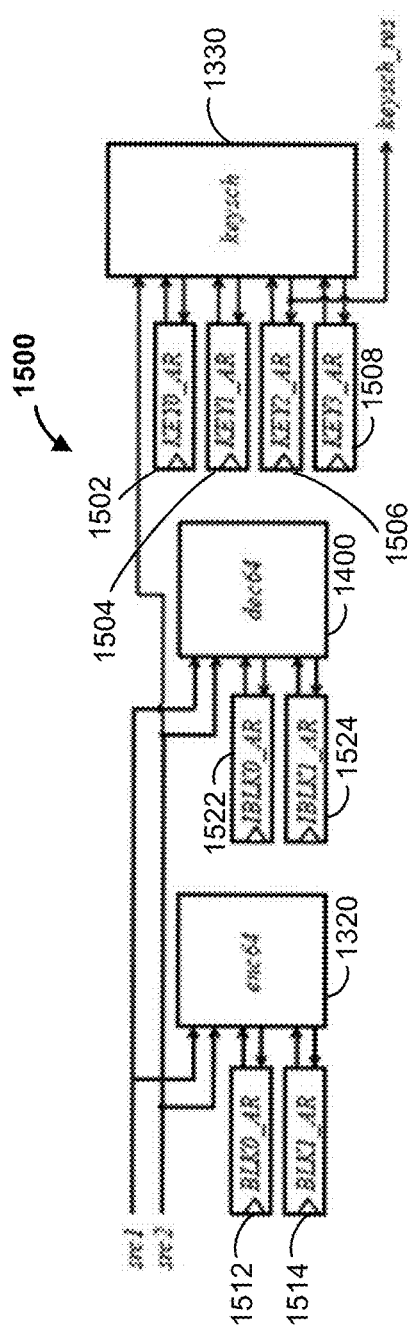
FIG. 15 shows the integration of enc64, keysch and dec64 instructions to auxiliary registers, according to some embodiments.

FIG. 15 shows the integration of enc64, keysch, and dec64 instructions custom logic or extensions to AUX registers, according to some embodiments. The keysch instruction datapath module or custom logic 1330 operates without any source operands, as it uses the data directly from assigned AUX registers—KEY0_AR, KEY1_AR, KEY2_AR, KEY3_AR registers 1502, 1504, 1506, 1508. Moreover, keysch module 1330 returns the value currently held by KEY2_AR 1506, which is the lower 32 bits of the round subkey. The enc64 and dec64 instruction datapath modules or custom logic 1320, 1400 take two source operands: src1 and src2, which are the upper and lower 32-bits, respectively, of the round subkey. The 64-bit message block is read from the BLK0_AR and BLK1_AR AUX registers 1512, 1514 for enc64 (or IBLK0_AR and IBLK1_AR AUX registers 1522, 1524 for dec64). The enc64 and dec64 instructions do not have any instruction output values. Instead, the results are written to their respective AUX registers.

Instruction Extensions for $F_2 255_{-19}$ Arithmetic

Characterization of $F_2 255_{-19}$ multiplicative operations: In some embodiments, Curve25519 arithmetic operations are defined over the Galois Field GF(p) (or $F_p$), where $p=2^{255}-19$. For a 32-bit platform, the plain representation of a single 255-bit finite field element (fe) requires eight 32-bit words. Henceforth, a 32-bit word is referred to as word.

In some embodiments, the DesignWare MetaWare Debugger execution profiling tool is run over a reimplementation in software adapted to the Synopsys ARC. It is expected that the finite field multiplicative functions are the performance bottleneck in Curve25519 implementations. In the optimized software implementation of Curve25519, in some embodiments, the multiplicative operations are listed in the table 1600 of FIG. 16.

In some embodiments, the field multiplicative operations are profiled using X25519 and Ed25519. The results show that around 80% of the total cycle count is consumed by the functions listed in the table 1600 of FIG. 16. These percentages, shown in the table 1700 of FIG. 17, indicate or suggest that custom extension instructions for the multiplicative finite field arithmetic would have a considerable impact on the overall performance. As such, in some embodiments, work is focused on these operations.

256×256-bit multiplication: An initial challenge in designing custom instructions to improve the performance of the functions listed in table 1600 of FIG. 16 is to outline an instruction datapath. Large multiplier units are possible but not as desirable, as they require a large amount of scarce hardware resources, which are limited in embedded hardware platforms. Thus, instead of creating a separate datapath for each of the multiplicative operations listed, according to some embodiments, systems and methods of the present disclosure implement custom extension instructions or logic for operations such as fe_sqr, fe_power, and fe_mul of Curve25519, through a unified datapath based on fe_mul_word.

Figures 18, 19:
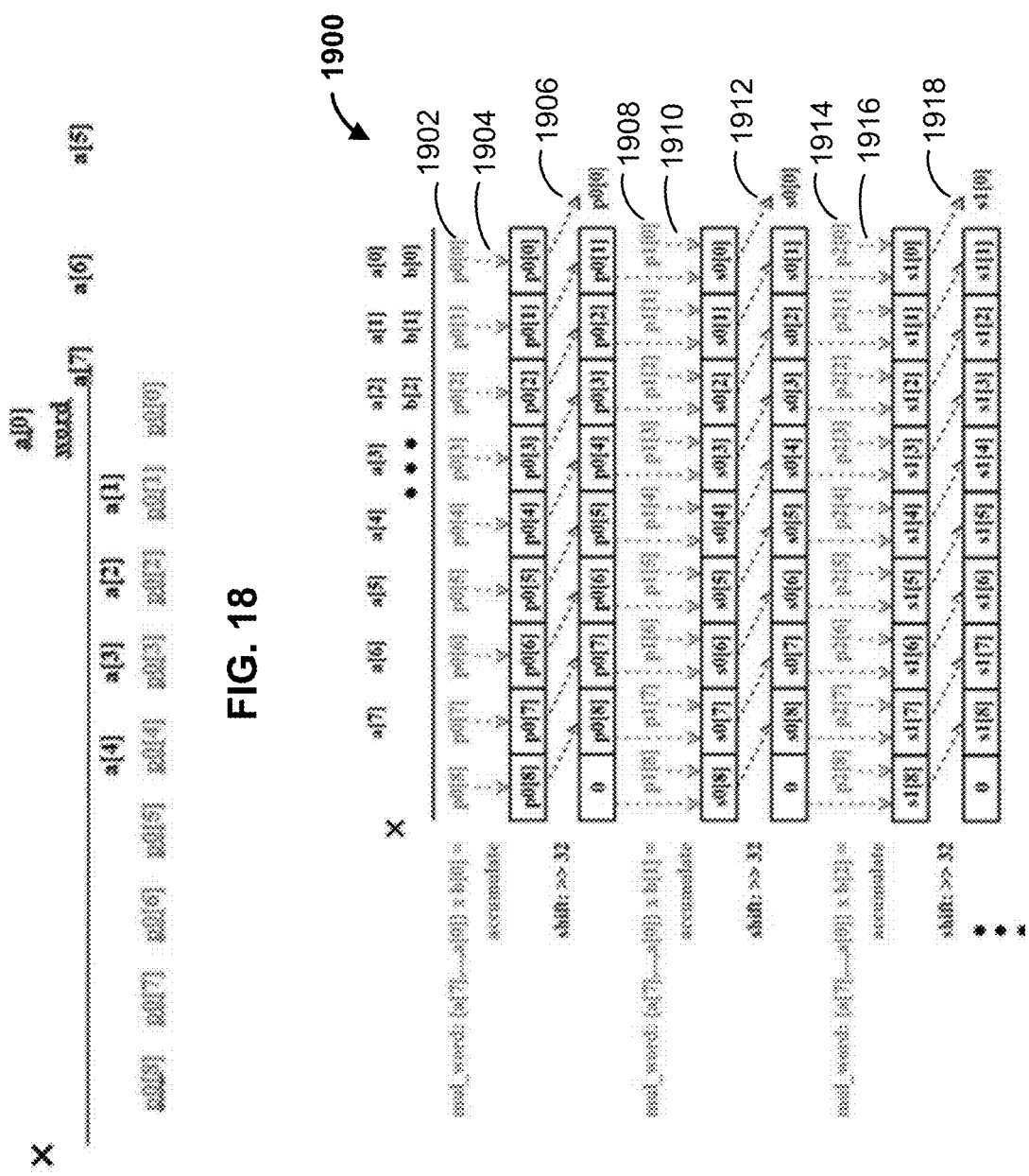
FIG. 18 shows an example of a schoolbook multiplication scheme.
FIG. 19 shows a scheme for 512-bit multiplication using a mul_word operation and an accumulator-and-shifter, according to some embodiments.

Consider the multiplication of a field element by a word (mul_word operation) using 32×32 bit multiplication as shown by the schoolbook multiplication scheme depicted in FIG. 18. In this context, where {a[7], . . . , a[0]} are the 32-bit words composing a field element, the full resulting product (including carry) would be represented as the 288-bit sequence{0[8], . . . p0[0]}, as shown in FIG. 18.

Figure 20:
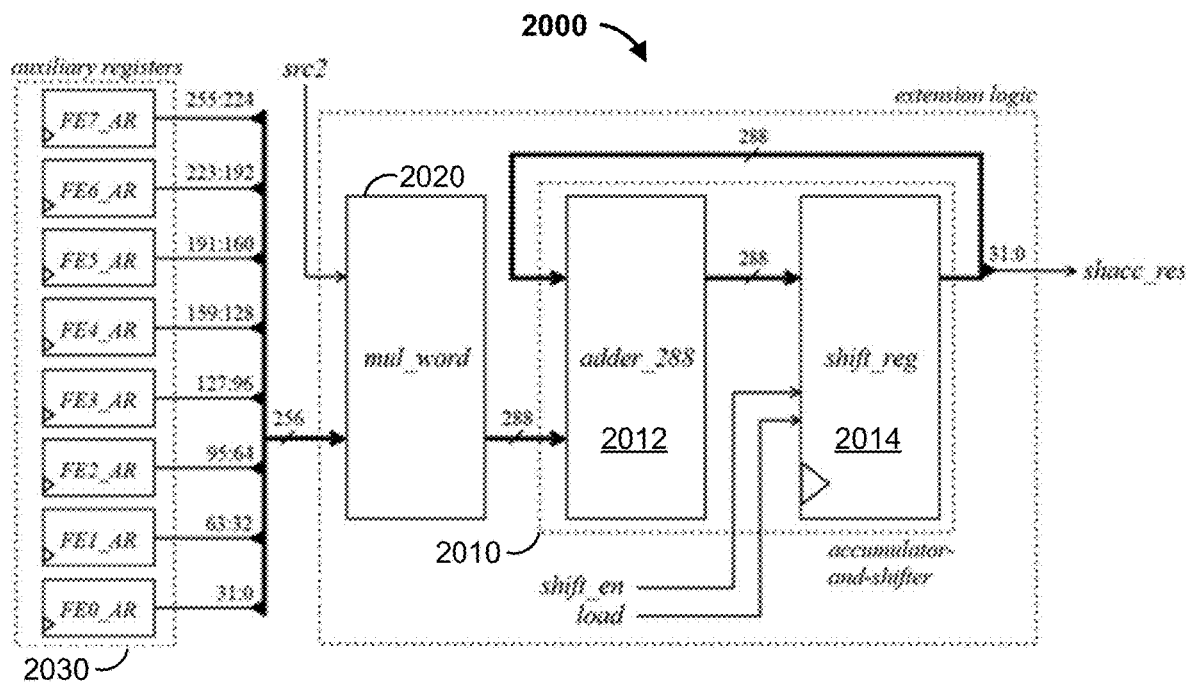
FIG. 20 shows a system for achieving a 256×256-bit full multiplication using an accumulator-and-shifter, according to some embodiments.

Extending the multiplication scheme above for the subsequent product rows, it is evident that fe×fe full multiplication would require a 512-bit accumulator. A 512-bit accumulator unit would require larger register and adder units that would not be used to their full extent during the intermediary multiplication rows computation. FIGS. 19 and 20 show a method 1900 and system 2000 for achieving a 256×256-bit full multiplication using a 288-bit accumulator-and-shifter 2010 instead of a 512-bit accumulator, according to some embodiments. An important observation is that each one of the sixteen 32-bit words composing the final full 512-bit product can be retrieved as soon as a multiplication row is obtained, i.e., a mul_word operation is performed. FIGS. 19 and 20 illustrate an implementation for the 256× 256-bit multiplication combining the mul_word operation (FIG. 18) with a 288-bit accumulator-and-shifter module 2010.

Referring to FIG. 19, starting at the multiplication pivot b[0], a mul_word operation 1902 is performed, for example, by a mul_word operation module 2020 (FIG. 20). The resulting 288-bit product row 1904 is added to the value currently held by the 288-bit accumulator (which is zero for the first operation). In some embodiments, this is performed by an adder 2012 of the accumulator-and-shifter module 2010 (FIG. 20). The accumulator's rightmost word p0[0] becomes the output value, and the 288-bit accumulator register is shifted 32 bits to the right at 1906. This can operation, which can be performed by shift register 2014 of the accumulator-and-shifter module 2010 (FIG. 20), ensures that the accumulator will never overflow. Mul-word operation module 2020 and accumulator-and-shifter module 2010 (comprising adder 2012 and shift register 2014) repeat this procedure (i.e., mul-word operation, addition, and shifting) at e.g., 1908-1918, etc. until pivot b[7]. At this point, the collected output values {s6[0], . . . , s1[0], s0[0], p0[0]} are the lower 256 bits of the 512-bit multiplication result. The upper 256 bits are the ones being held by the 288-bit accumulator. The consecutively captured {s14, . . . , s7, s6[0], . . . , s0[0], p0[0]} set of words compose the final full 512-bit product. One advantage of this system and method is the weak reduction process. It can be started right after the b[7] pivot is reached, being performed in parallel with the shifting retrieval process of the upper eight words, saving processing time and temporary registers.

Instruction set extension (ISE): A consideration when organizing instruction set extension (ISE) for the multiplicative operations listed in the table 1600 of FIG. 16 is to design a unified instruction datapath module. This approach differs from the ISE for PRESENT block cipher (FIG. 10), where each one of the APEX instructions had dedicated datapaths and AUX registers. In this manner, APEX technology also offers the option to create instruction extension groups. This feature allows instructions within the same group to access shared datapath modules and AUX registers. The table 2100 of FIG. 21 shows the proposed custom extension instructions for the $F_2 255_{-19}$ multiplicative operations listed in the table 1600 of FIG. 16. These will share hardware resources from a unified datapath construction. Additionally, the field element, which is one of the operands of the mword instruction, is available to the APEX instruction datapath by means of the FEi_AR registers, where i= {0, . . . , 7}.

mul_word module: An initial step towards the implementation of the mul_word operation is the design of the smallest arithmetic unit: the 32×32-bit (word-by-word) multiplication unit with carry-in and carry-out signals. As the target platform for this work is an FPGA device, we can make use of the DSP slices to implement the mul32 modules.

Figure 22:
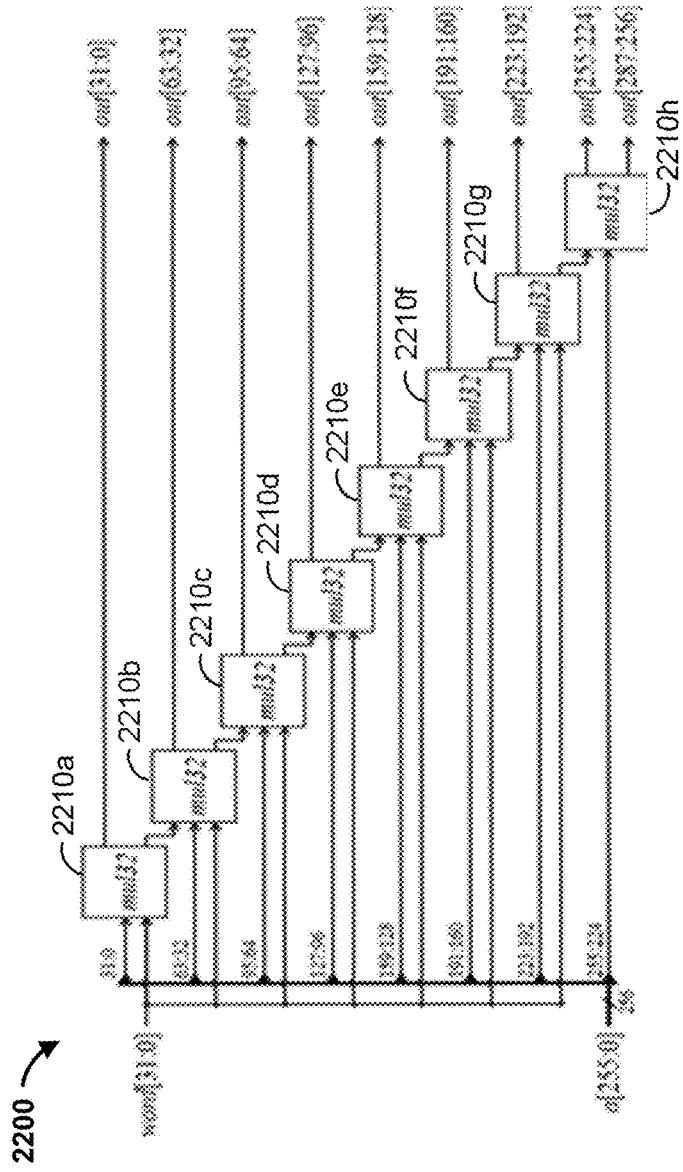
FIG. 22 illustrates an implementation for mul_word module or multiplier unit, according to some embodiments.

The mul32 module 2210 is used as the building block for the implementation of the mul_word module 2200 shown in FIG. 22, which itself can be an implementation for the mul-word operation module 2020 (FIG. 20). As shown in FIG. 22, in some embodiments, a total of eight mul32 modules 2210a-h with cascaded carry signals are used; a is the finite field element (FE), and out is the 288-bit output. In some embodiments, this module could be split into pipeline stages to achieve higher throughput. However, in embodiments where minimal latency is a primary goal, pipeline registers are not introduced, as it would result in several extra cycles of latency.

APEX integration: For the integration of the instructions' datapath modules into the APEX pipeline, the AUX registers 2030 (e.g., FE0_AR, FE1_AR, FE2_AR, FE3_AR, FE4_AR, FE5_AR, FE6_AR, FE7_AR) are directly connected to the mul_word operation module 2020's field element input ports, as shown in FIG. 20. The word operand of mul_word module 2020 is passed to the instruction datapath as the mword instruction's source operand (src2). The mul_word's output value is forwarded to one of the adder module 2012's inputs, which then sums this value with the one currently stored in the shift register module 2014. Simultaneously, the mword instruction also enables the shift register's load signal, making the shift register module 2014 store the current output value of adder module 2012. Moreover, the shacc instruction, which does not have source operands, simply enables the shift_en signal to shift the contents of the internal register of shift register module 2014. With the instruction datapath shown in FIG. 20, a mul_word operation is executed in two clock cycles, assuming that the field element (FE) source operands are already available in the AUX registers 2030.

Programming with Dual-Data Memory Banks

According to some embodiments, the systems and methods for hardware acceleration, e.g., in V2X environments, can be implemented with dual-data memory banks in hardware. One purpose of dual-data memory banks is to provide greater bandwidth. For example, among digital signal processing (DSP) mechanisms, dual-data memory banks (often referred as X and Y memory banks) have been incorporated in order to enable the simultaneous fetching of instruction data plus two-operand data. This enables greater memory access bandwidth for algorithms where repeated operations on arrays is done.

But using dual-data memory banks requires proper assignment of data to each memory bank, which can be a challenging task for obtaining optimal performance. This problem is illustrated through the code snippet of Listing 7, an example implementation of a dot-product with dual-data memory banks. We start by introducing this example using the C snippet below:

```
...
void dot_product (uint32_t *a, uint32_t *b, uint32_t *out) {for (int i = 0;i <
    N;i++) ( out[i] = a[i] *b[i];
    }
} ...
```

The code snippet shown above can be directly translated into the Assembly language implementation of Listing 6.

Listing 6

```
# r0 <- a, r1 <- b, r2 <- out
...
loop_in: # loop N time ld.ab| ,
    %r3,[%r0,4] ld.ab        # fetch a[i]
    %r4,[%r1,4] mul          # fetch b[i]
    %r3,%r3,%r4 st.ab
    %r3,[%r2,4]              # write c[i]
loop_end:
    ...
```

Listing 7

```
# agu_r0 <- a, agu_r1 <- b, agu_r2 <- out
...
loop_in: # loop N times
    # fetch a[i] and b[i], and # write c [i] at
    the same cycle mul
    %agu_r2,%agu_r0,%agu_r1
loop...end:
    ...
    ...
```

The traditional mul instruction is used in this example. The .ab tag specifies the post-increment address write-back mode for the load (ld) and store (st) instructions.

For the equivalent implementation using dual-data memory banks (i.e., XY Memory), assume that the arrays a, b and out are already mapped to the XY memory address space through the AGU registers % agu_r0, % agu_r1 and % agu_r2, respectively. Also consider that the corresponding AGU pointers get incremented by 4 bytes whenever % agu_r0, % agu_r1 and % agu_r2 are accessed. In such configuration, the dot-product can be implemented using XY memory as shown in the code snippet of Listing 7.

Given the comparison above, it is noted that the ARC XY Memory DSP subsystem (as shown in FIG. 12) is capable of performing two operand fetches and a write-back in a single instruction. Such operation would require at least three instructions in a traditional load/store programming scheme. However, the execution of the aforementioned instruction in a single cycle depends primarily on the correct allocation of the input arrays to the appropriate memory banks: in Listing 7, by allocating the arrays a and b to distinct memory banks, a[i] and b[i] elements can be fetched in parallel within a single cycle. However, if the input arrays were programmed to the same memory bank, the array elements would only be sequentially accessible, i.e., in two cycles, thus reducing the performance by a factor of two. Therefore, the optimal usage of dual-data memory banks can rely on the proper allocation of data into the available memory banks.

It is also noted that implementations using XY memory inherit a code overhead regarding the initialization of the AGU registers and indexing modes. However, this overhead becomes negligible whenever looping over arrays of eight elements or more, due to the additional instructions required on the traditional load/store approach.

Cryptographic functions often get implemented using DSP-analogous repetitive array-based techniques, e.g., the PRESENT cipher's encryption/decryption rounds and $F_2 255_{-19}$ arithmetic operations. Hence, dual-data memory banks also offer opportunities for performance enhancements in cryptographic processing.

It is demonstrated herein how systems and methods of the present disclosure, according to some embodiments, combine the instruction set extensions (ISE) for PRESENT and $F_2 255_{-19}$ with the ARC XY Memory DSP subsystem (e.g., as shown in FIG. 12) in order to achieve significant improvements in performance. In some embodiments, this requires the instruction operands be located in the correct X and Y memory banks. In the examples described below, AGU registers labeled with %agu_x are designated to the X memory bank 1202, whereas registers labeled with %agu_y are designated to the Y memory bank 1204.

XY Memory Programming for the PRESENT Cipher

This section outlines an approach, according to some embodiments, for leveraging the ARC XY Memory DSP Option (as shown and described with reference to FIG. 12) in order to achieve Implicit Instruction-Level Parallelism (IILP) with the developed instruction set extension (ISE) for PRESENT. According to some embodiments, first data for the custom extension logic for the block encryption instruction is provided through one of the X and Y memory banks, and second data for the custom extension logic for the key schedule instruction is provided through the other of the X and Y memory banks. In some embodiments, provision of the first data through one of the X and Y memory banks is simultaneous with provision of the second data through the other of the X and Y memory banks, thus providing or supporting parallelism of instruction.

In some embodiments, initially, it is demonstrated how the key schedule (keysch) function implemented using traditional load/store flow can be converted into the equivalent XY memory programming scheme. For the code snippets of Listings 8 and 9, assume that the % KEY0_AR, % KEY1_AR, % KEY2_AR and % KEY3_AR AUX registers (e.g., FIG. 15) are already initialized with the 128-bit key value. Further, assume that the 64-bit values resulting from each key schedule round are consecutively stored in two distinct 32-bit arrays, namely round_keys_h and round_keys_l. As such, for a given round i, the 64-bit round key is given by the concatenation of {round_keys_h[i], round_keys_l[i]}.

Listing 8

```
# r0 <- round_keys_l
# r1 <- round_keys_h
...
```

Listing 8

```
loop_in: loop 31 times
    keysch %r2,%lp_count
    st.ab %r2,[%r0,4] lr
        %r2,[%KEY3_A
    R] st.ab %r2,[%r1,4]
loop_end:
    ...
```

Listing 9

```
# agu_x0 <-
round_keys_l
# agu_y0 <-
round_keys_h
...
loop_in: # loop 31
times     keys ch
%agu_x0,%lp_coun
t           lr
%agu_y0,[%KEY3_A
R] loop_end:
    ...
    ...
    ...
```

For the code on Listing 9, also assume that the round_keys_l and round_keys_h are assigned to the X and Y memory banks 1202, 1204 (FIG. 12). This is done through the AGU registers % agu_x0 and % agu_y0 (AGU registers 1210 in FIG. 12). Since the keysch instruction (e.g., as implemented by extension module 1330 of FIGS. 13 and 15) returns only the value that is written back to the % KEY2_AR AUX register (see FIG. 15), it may be necessary to manually read the value from % KEY3_AR in order to capture the full round key value.

By using the keysch instruction alongside the XY memory, it is possible to implement the key schedule algorithm's inner-loop rounds using 50% fewer instructions. For this particular case, the XY memory allocation is not critical, as there is no instruction which fetches two operands at the same time.

At this point, assume that the round key values are already computed and stored in the round_keys_l and round_keys_h arrays in the X and Y memory banks 1202, 1204. The code snippets of Listings 10 and 11 show the implementation of the encryption function's main loop (i.e., encryption rounds) according to the load/store flow and the equivalent XY memory flow. When comparing both code snippets, it is demonstrated that the encryption function's inner loop can be executed in a single cycle, with the enc64 instruction (e.g., as implemented in extension module 1320 of FIGS. 13 and 15) in fetching the two operands simultaneously. The final 64-bit encrypted message is stored in the AUX registers % BLK0_AR and % BLK1_AR (e.g., AUX registers 1512, 1514 of FIG. 15), where it can be read using the lr instruction.

Listing 10

```
# r0 <- round_
# r1 <- round_
... loop_in: #
```

Listing 10

```
ld.ab ld.ab
    enc64
loop...end:
    ...                loop 31 times
                       %r2,[%r0,4]
                       %r3,[%r1,4]
                       0,%r3,%r2
```

Listing 11

```
# agu_x <- round_keys_l in X memory bank
# agu_y <- round_keys_h in Y memory bank
...
loop_in: # loop 31 times enc64
    0,%agu_y0,%agu_x0
loop_end:
    ...
    ...
    ...
```

The decryption function using the dec64 instruction follows the same logic, as shown by the code snippets of Listings 12 and 13.

Listing 12

```
# r0 <- roundund_keys_h
# r1 <- ro
    ...               # loop 31 times
loop_in:    %r2,[%r0,4]
ld.ab ld.ab %r3,[r1,4]
dec64       0,%r3,%r2
loop_end:
    ...
```

Listing 13

```
# agu_x <- round_keys_l
# agu_y <- round_keys_h
...
loop_in: # loop 31 times dec64
    0,%agu_x0,%agu_y0
loop_end:
    ...
    ...
    ...
```

The only difference here is that the final 64-bit decrypted message is stored in AUX registers % IBLK0_AR and % IBLK1_AR (e.g., AUX registers 1522, 1524 of FIG. 15), where it can be read using the lr instruction. For the key schedule, encryption and decryption routines shown above, the utilization of the XY memory subsystem (such as that shown in FIG. 12) enables the implementation of the main inner-loops using 50% to 66% fewer instructions. In some embodiments, this can yield an improvement in performance by a factor of two to three.

XY Memory Programming for $F_2 255_{-19}$ Arithmetic

Continuing with the ARC XY Memory DSP Option, this section outlines the techniques for obtaining Implicit Instruction-Level Parallelism (IILP) with the developed instruction set extension (ISE) for $F_2 255_{-19}$ arithmetic.

According to some embodiments, first data for the custom extension logic for the instruction for multiplication of a field element by a word is provided through the X memory bank, and second data for the custom extension logic for the instruction for multiplication of a field element by a word is provided through the Y memory bank. In some embodiments, provision of the first data through the X memory bank is simultaneous with provision of the second data through the Y memory bank, thus providing or supporting parallelism for the instruction.

In some embodiments, initially, it is shown how to translate the fe×fe full multiplication operation from the traditional load/store implementation to the XY memory approach. For the fe×fe operation in Listings 14 and 15, consider that the 256-bit operand a is already held by the eight % FEi_AR AUX registers (e.g., AUX registers 2030 of FIG. 20), where i={0, . . . , 7}. The second operand is represented by the b array, and the 512-bit output is returned in two separate 256-bit arrays, out_l and out_h. They contain the least significant half and most significant half of the output, respectively. For the XY memory implementation in Listing 8, the out_l and out_h arrays are contained in different X and Y memory banks 1202, 1204, such that they can be fetched within the same cycle.

Listing 14

```
# FEI_AR <- a, r0 <- b # r1 <-
out_l, r2 <- out_h
    ...
# 1st loop: get out_l loop_in: #
loop 8 times ld.ab %r3,[%r0,4]
mword 0,%r3 shacc %r3,0
st.ab %r3,[%r1,4]
loop_end: ...
# 2nd loop: get out_h loop2_in:
# loop 8 times times shacc %r3,0 stab
%r3,[%r2,4]
loop2_end: ...
```

Listing 15

```
# FEI_AR <- a, agu_x0 <- b # agu_y0 <-
out_l, agu_x1 <- out_h
    ...
# 1st loop: get out_l loop_in#
loop 8 times mword
0,%agu_x0 shacc %agu_y0,0
loop_end: ...
# 2nd loop: get out_h loop2_in: #
loop 8 times shacc %agu_x1,0
loop2_ed:
    ...
    ...
    ...
    ...
```

Weak reduction and non-multiplicative operations: In order to allow intermediate results to fit within 256 bits (8 words), some embodiments perform a modular reduction to $2^{256}-38$, exactly double the true field modulus of $2^{255}-19$. This is done to improve efficiency: the reduction to $2^{256}-38$ can be done using only addition with carry. Full reduction is done only once at the very end and requires some bit level manipulations, which is more costly timewise.

In addition to the fe×fe and weak reduction operations, some embodiments require fe+fe, fe−fe, and full reduction. In some embodiments, these non-multiplicative $F_2 255_{-19}$ operations are all implemented using standard ARC processor instructions along with the AGU to efficiently load and store the field elements (FE) from memory. The basic method of implementation for these operations is as follows: (1) Set up the AGU to read in the field elements one word at a time; (2) Set up the AGU to write the result; (3) Perform the operation, storing the intermediate results in regular processor registers; (4) Perform weak reduction on the intermediate results and write the reduced output to XY memory. A benefit of storing the intermediate results in regular CPU registers is that it saves cycles by not having to set another AGU base address register, which must be done using the sr instruction.

Further details on weak reduction: The weak reduction itself can be explained: assume we have a 288 bit result in an array of nine words P[8], . . . , P[0] where P[8] is the most significant. Multiply P[8] by 38 and add it to P[7, . . . , 0]. Since the field elements are 256-bits long, addition, subtraction and multiplication by two will only carry at most one bit to P[8]. Which means if P[8]==1, then add 38 to P[7, . . . , 0]. Although simple, there are two corner cases to consider when P[7 . . . 0]>=$2^{256}$−38:

If P[8]==0, then we would not add 38 and simply take the result in P[7 . . . 0] which would not be fully reduced mod $2^{256}$−38. This can be safely ignored, as all of the field arithmetic operations are designed to work with 256-bit inputs.

If P[8]==1, then adding 38 to P[7 . . . 0] will result in P[7 . . . 1] being 0 and P[0] being a very small value. In this case, it is necessary to add an additional 38 in order to achieve the correct reduction. As the weak reduction is an integral part of the field operation, it makes more sense to discuss the details of its implementation in that context. This is done below for the fe_add operation.

fe_add: The fe_add operation takes two 256-bit inputs in XY memory and stores the resulting sum to XY memory reduced to $2^{256}$−38. For this, we make use of the ARC processor's add with carry instruction: adc a,b,c # (a=b+c+carry).

Listing 16 is an implementation for fe+fe operation with XY memory.

Listing 16

```
# agu_x0 <- first field element in X bank # agu_y0 <-
second field element in Y bank
    ...
    mov   p8,0
    add.f P0,%agu_x0,%agu_y0 adc.f
    P1,%agu_x0,%agu_y0 adc.f
    P2,%agu_x0,%agu_y0 adc.f
    P3,%agu_x0,%agu_y0 adc.f
    P4,%agu_x0,%agu_y0 adc.f
    P5,%agu_x0,%agu_y0 adc.f
    P6,%agu_x0,%agu_y0 adc.f
    P7,%agu_x0,%agu_y0 mov.c P8,38
    ...
```

In Listing 16, P0-P8 are arbitrary processor registers that correspond with the intermediate 288-bit results that become the input to the weak reduction.

The addition of the first word uses add since there is no previous operation that needs to be carried. The ".f" indicates that the carry flag should be set if the results of the addition overflows the 32-bit destination. The subsequent additions use adc which will then add the value of the previous operation's carry flag to the result. Technically, the most significant word P[8] should be 1 in the case of the final adc producing a carry, or 0 otherwise. This could be done using adc P8,0,0. However, in preparation for the weak reduction, it may be desirable to have 38 in the case of a carry as this is the value that needs to be added. This is accomplished using a conditional move instruction (mov.c): In the case of a carry, P8 will be set to 38, otherwise it will contain the previously set value of 0.

Listing 17 is an implementation for weak reduction operation after addition.

Listing 17

```
# agu_xy0 and r1 <- destination field element in either X or Y bank
    ...
    add.f    %agu_xy0,P0,P8
    adc.f %agu_xy0,P1,0 adc.f
    %agu_xy0,P2,0    adc.f
    %agu_xy0,P3,0    adc.f
    %agu_xy0,P4,0    adc.f
    %agu_xy0,P5,0    adc.f
    %agu_xy0,P6,0    adc.f
    %agu_xy0,P7,0       jcc
    [%blink]
    # Handle the corner case when final carry overflows and 38 needs
    # to be added again ld_s
    %r1,[%r0,0] add
            %r1,%r1,38 j_s.d
    [%blink]
    st_s %r1,[%r0,0]
    ...
```

The code in Listing 17 immediately follows the previous addition and is a straightforward implementation of the weak reduction already discussed: P8 will contain either 0 or 38 which is added to the least significant word of the intermediate sum in P0. The following add with carry operations will propagate any additional carry as well as write the result to the destination XY memory. The jcc instruction is a conditional jump instruction (in this case, jump if carry not set): If the final adc did not generate a carry, then we are done and will return to the caller. If carry was set, then an additional 38 is added to P[0] and written to the output.

fe_sub: The fe_sub operation takes two 256-bit inputs in XY memory and stores the resulting difference to XY memory reduced to $2^{256}$−38. For this, we make use of the ARC processor's subtract with carry instruction: sbc a,b,c # (a=b−c−carry)

The implementation follows the same pattern as fe_add, except that all of the add/adc become sub/sbc.

fe_mul2: Several times in the high level elliptic curve functions we need to do a field multiplication by two. Using the existing field multiplication by a digit function (fe_mul_word) for this can be inefficient. Using the fe_add function to add the field element to itself would accomplish the task. However, this presents a problem when using the AGU 1206 to read the same value twice from the same memory bank, since this introduces an extra cycle of latency for every read. Alternatively, the rotate left through carry instruction allows for an efficient implementation of multiplication by two using a single input operand: rlc b,c # (b=c<<1; b=b OR carry).

For the first word's left shift, the asl instruction is used since there is no initial carry. For subsequent shifts rlc is used. The weak reduction is identical to that in fe_add.

fe_rdc: As previously discussed, the weak reduction that is done at the end of each field operation reduces the result modulo $2^{256}$−38 in order to keep the intermediate results within 256 bits. As the final step in a series of calculations, a final modular reduction to $2^{255}$−19 needs to be done. For this, we look at bit 256 of the intermediate output: If the bit is set, clear it and add 19 to the result. This code snippet is shown in listing 18, corresponding to a full reduction operation.

---
Listing 18
---

\# agu_x0 <- input field element in X bank (r0) # agu_x1 <- output field element in X bank (r1)

```
    ...
    ld      %r0,[%r0,28] asr         %r1,%r0,31 and
    %       r1,%r1,19 #r1 = (a[7] >> 31) * 19 bdr
    %r0,%r0,31 #r0 = α[7] & 0x7fffffff
    add.f%agu_x1,%agu_u1,%r1 adc.f
    %agu_x1,%agu_x0,0 adc.f
    %agu_x1,%agu_x0,0 adc.f
    %agu_x1,%agu_x0,0 adc.f
    %agu_x1,%agu_x0,0 adc.f
    %agu_x1,%agu_x0,0 adc.f
    %agu_x1,%agu_x0,0 adc.f
    %agu_x1,%agu_x0,0 adc.f
    %agu_x1,%agu_x0,0 j_s,d [%blink]
    adc     %agu_x1,%r0,0
    ...
```
---

As we are only looking at bit 256, there is the corner case where the input value before reduction is in the range of $2^{255}-1$ and $2^{255}-19$. This would correspond with an elliptic curve point of 0-18.

Testing Methodology

Test vectors from both ISO/IEC 29192-2 standard and lightweightcrypto.com were used for verifying the intermediate and final outputs of the implementations for PRESENT block cipher described herein. Meanwhile, test vectors from RFC7748 and RFC8032 were used for verifying the implementations for hardware acceleration of X25519 and EdDSA, respectively, described herein.

In some embodiments for the testbed, the following ARC EM9D processor specifications were chosen: (1) ARCv2EM core, (2) DCCM and ICCM banks of size 65K each, (3) X and Y Memory banks of size 8K each, and (4) medium-sized AGU controller. All time measurements and verification procedures are performed over the DesignWare ARC xCAM cycle-accurate processor model tool. For the estimation of FPGA logic overhead introduced by the developed instructions' datapaths, the ARC's RTL processor model (containing the developed Instruction Set Extensions (ISE)) is synthesized targeting a Xilinx UltraScale XCZU9EG FPGA device.

Results

Figure 23:
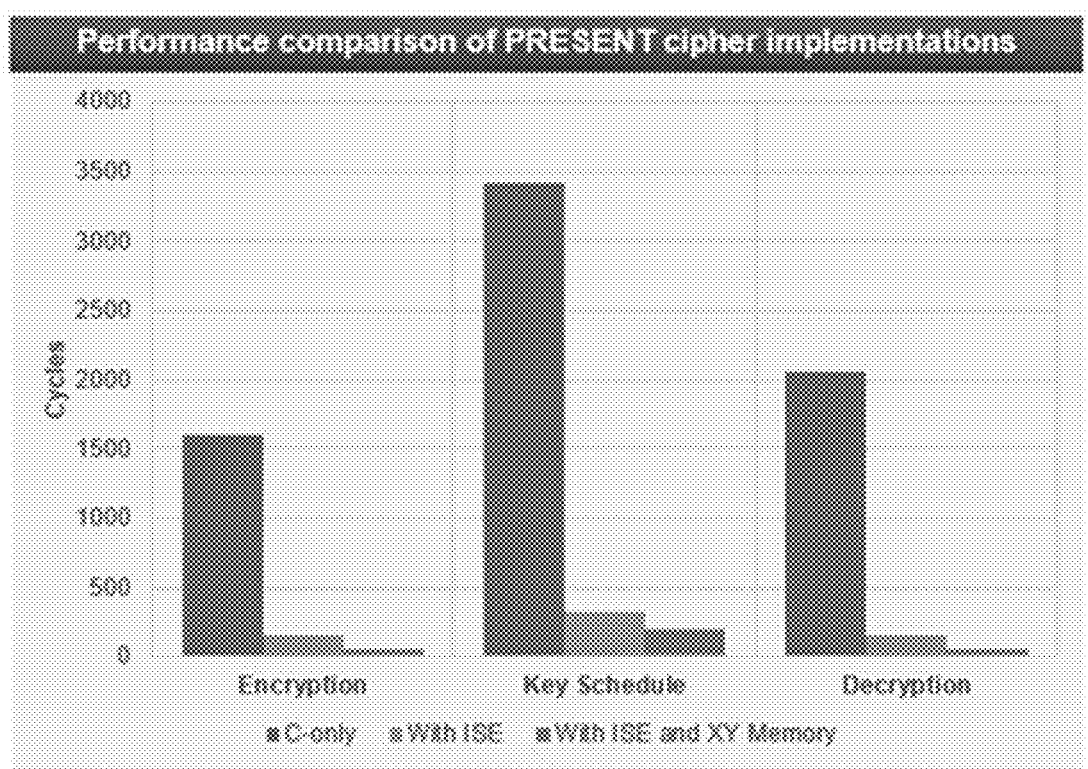
FIGS. 23-25 illustrate examples comparing the performance results of embodiments of the present disclosure against other implementations.
Figure 24:
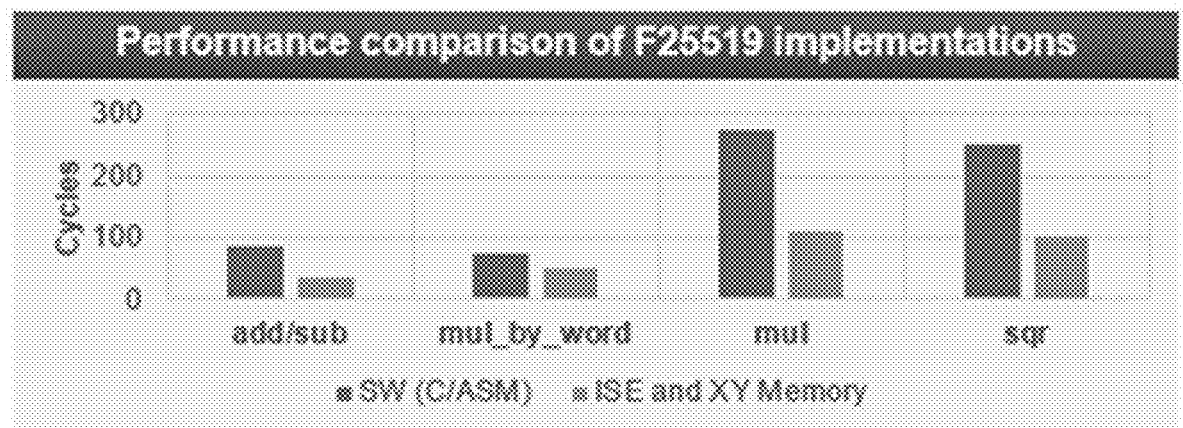
Figure 25:
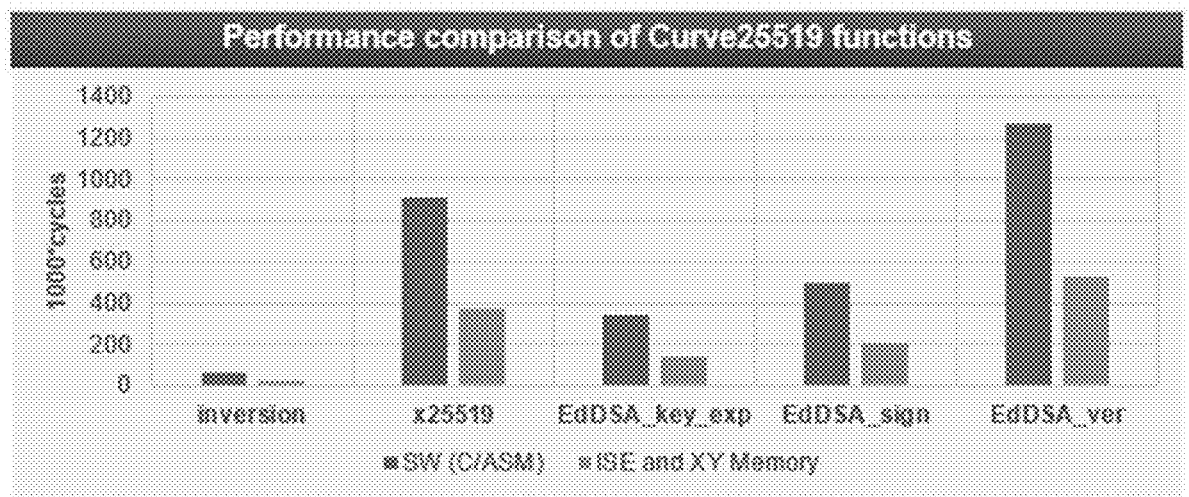

Embodiments of the present disclosure provide improvement over previously developed implementations, as demonstrated by the results shown in FIGS. 23-25.

Referring to FIG. 23, with respect to PRESENT block cipher implementation, incorporating the instruction set extension (ISE) results in an increase of speed by a factor of 9 to 12, and a reduction in code size by a factor of 7.6. Incorporating the instruction set extension (ISE) and using the dual-data memory banks (XY memory) results in an increase of speed by a factor of 17 to 34, and code size still 70% smaller. In order to implement the ISE's datapath, FPGA logic overhead is increased, but not significantly: 4.37% additional CLB LUTs (logic) 8.26% additional CLB registers (FF).

Referring to FIGS. 24 and 25, with respect to Curve25519 implementation, incorporating the instruction set extension (ISE) and using the dual-data memory banks (XY memory) results in 2.45× improvement in fe_sqr and 2.56× improvement in fe_mul, and ~45% reduction in code sizes. In order to implement the ISE's datapath, FPGA logic overhead is increased, but again not significantly: 9.1% additional CLB LUTs (logic), 14,7% additional CLB registers (FF), 32 DSP blocks, 140 CARRY8 blocks.

The embodiments described above illustrate but do not limit the invention. For example, the techniques described for vehicles can be used by other mobile systems, e.g., pedestrians' smart phones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g., they can be used on a computer system.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures typically represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer hardware system that has been configured for accelerated operations in provisioning of digital certificates for use in authentication operations, the system comprising:
   a processor core;
   a memory core in communication with the processor core
      to implement a PRESENT block cipher for supporting
      a cryptography algorithm, the PRESENT block cipher comprising an instruction for block encryption and an instruction for key scheduling;
a first custom extension logic for the block encryption instruction of the PRESENT block cipher, wherein the first custom extension logic comprises a first plurality of auxiliary registers implementing a first datapath for the block encryption instruction of the PRESENT block cipher; and
a second custom extension logic for the key schedule instruction of the PRESENT block cipher, wherein the second custom extension logic comprises a second plurality of auxiliary registers implementing a second datapath for the key schedule instruction.

2. The system of claim 1, wherein the computer hardware system is implemented at least in part in an extensible processor platform.

3. The system of claim 1 wherein at least one of the first custom extension logic for the block encryption instruction and the second custom extension logic for the key schedule instruction is implemented from resources of the processor core or memory core.

4. The system of claim 1 wherein the PRESENT block cipher comprises an instruction for block decryption, the system comprising a third custom extension logic for the block decryption instruction of the PRESENT block cipher.

5. The system of claim 1 wherein the memory core comprises dual-data memory banks.

6. The system of claim 5 wherein the dual-data memory banks comprise an X memory bank and a Y memory bank.

7. The system of claim 6 wherein first data for the first custom extension logic is provided through one of the X and Y memory banks, and wherein second data for the second custom extension logic is provided through the other of the X and Y memory banks.

8. The system of claim 7 wherein provision of the first data through one of the X and Y memory banks is simultaneous with provision of the second data through the other of the X and Y memory banks.

9. A method for configuring a computer hardware system for accelerated operations in provisioning of digital certificates for use in authentication operations, the method comprising:
providing a computer hardware system comprising a processor core and a memory core in communication to implement a PRESENT block cipher for supporting a cryptography algorithm, the PRESENT block cipher comprising an instruction for block encryption and an instruction for key scheduling;
configuring a first custom extension logic in the computer hardware system, wherein the first custom extension logic for the block encryption instruction of the PRESENT block cipher, wherein the first custom extension logic comprises a first plurality of auxiliary registers implementing a first datapath for the block encryption instruction of the PRESENT block cipher; and
configuring a second custom extension logic in the computer hardware system, wherein the second custom extension logic for the key schedule instruction of the PRESENT block cipher, wherein the second custom extension logic comprises a second plurality of auxiliary registers implementing a second datapath for the key schedule instruction.

10. The method of claim 9, wherein the computer hardware system is implemented at least in part in an extensible processor platform.

11. The method of claim 9 wherein at least one of the first custom extension logic for the block encryption instruction and the second custom extension logic for the key schedule instruction is implemented from resources of the processor core or memory core.

12. The method of claim 9 wherein the PRESENT block cipher comprises an instruction for block decryption, the method comprising configuring a third custom extension logic in the computer hardware system, wherein the third custom extension logic for the block decryption instruction of the PRESENT block cipher.

13. The method of claim 9 wherein the memory core comprises dual-data memory banks.

14. The method of claim 13 wherein the dual-data memory banks comprise an X memory bank and a Y memory bank.

15. The method of claim 14 comprising:
providing first data for the first custom extension logic through one of the X and Y memory banks; and
providing second data for the second custom extension logic through the other of the X and Y memory banks.

16. The method of claim 15 wherein providing of the first data through one of the X and Y memory banks is simultaneous with providing of the second data through the other of the X and Y memory banks.

17. A computer hardware system that has been configured for accelerated operations in provisioning of digital certificates for use in authentication operations, the system comprising:
a processor core;
a memory core in communication with the processor core to implement F25519 finite-field arithmetic for supporting a cryptography algorithm, the F25519 finite-field arithmetic comprising an instruction for multiplication of a field element by a word; and
a custom extension logic for the instruction for multiplication of a field element by a word;
wherein the custom extension logic for the instruction for multiplication of a field element by a word comprises:
an accumulator-and-shifter module operable to store a current sum value; and
a mul_word operation module operable to generate an n-bit product relating to the multiplication of a field element by a word;
wherein the accumulator-and-shifter module operable to combine the n-bit product with the current sum value, and shift the result to generate a new sum value.

18. The system of claim 17, wherein the computer hardware system is implemented at least in part in an extensible processor platform.

19. The system of claim 17, wherein the custom extension logic for the instruction for multiplication of a field element by a word is implemented from resources of the processor core or memory core.

20. The system of claim 17, wherein the custom extension logic for the instruction for multiplication of a field element comprises a plurality of auxiliary registers implementing a datapath for the instruction for multiplication of a field element by a word.

21. The system of claim 17 wherein the memory core comprises dual-data memory banks.

22. The system of claim 21 wherein the dual-data memory banks comprise an X memory bank and a Y memory bank.

23. The system of claim 22 wherein first data for the custom extension logic is provided through the X memory bank, and wherein second data for the custom extension logic is provided through the Y memory bank.

24. The system of claim 23 wherein provision of the first data through the X memory bank is simultaneous with provision of the second data through the Y memory bank.

25. A method for configuring a computer hardware system for accelerated operations in provisioning of digital certificates for use in authentication operations, the method comprising:
providing a computer hardware system comprising a processor core and a memory core in communication to implement F25519 finite-field arithmetic for supporting a cryptography algorithm, the F25519 finite-field arithmetic comprising an instruction for multiplication of a field element by a word;
configuring a custom extension logic in the computer hardware system, wherein the custom extension logic for the instruction for multiplication of a field element by a word;
wherein the custom extension logic for the instruction for multiplication of a field element by a word comprises:
an accumulator-and-shifter module operable to store a current sum value; and
a mul_word operation module operable to generate an n-bit product relating to the multiplication of a field element by a word;
wherein the accumulator-and-shifter module operable to combine the n-bit product with the current sum value, and shift the result to generate a new sum value.

26. The method of claim 25, wherein the computer hardware system is implemented at least in part in an extensible processor platform.

27. The method of claim 25 wherein the custom extension logic for the instruction for multiplication of a field element by a word is implemented from resources of the processor core or memory core.

28. The method of claim 25, wherein the custom extension logic for the instruction for multiplication of a field element comprises a plurality of auxiliary registers implementing a datapath for the instruction for multiplication of a field element by a word.

29. The method of claim 25 wherein the memory core comprises dual-data memory banks.

30. The method of claim 29 wherein the dual-data memory banks comprise an X memory bank and a Y memory bank.

31. The method of claim 30 comprising:
providing first data for the custom extension logic through the X memory bank; and
providing second data for the custom extension logic through the Y memory bank.

32. The method of claim 31 wherein providing of the first data through the X memory bank is simultaneous with providing of the second data through the Y memory bank.

* * * * *